US010380864B2

(12) United States Patent
Hosoi et al.

(10) Patent No.: US 10,380,864 B2
(45) Date of Patent: Aug. 13, 2019

(54) WATCHING SYSTEM, WATCHING DETECTION DEVICE, AND WATCHING NOTIFICATION DEVICE

(71) Applicants: Rohm Co., Ltd., Kyoto (JP); Finewell Co., Ltd., Osaka (JP)

(72) Inventors: Hiroshi Hosoi, Osaka (JP); Yoji Hosoi, Osaka (JP); Masahide Tanaka, Osaka (JP)

(73) Assignee: Finewell Co., Ltd., Osaka (JP)

( * ) Notice: Subject to any disclaimer, the term of this patent is extended or adjusted under 35 U.S.C. 154(b) by 0 days.

(21) Appl. No.: 15/993,695

(22) Filed: May 31, 2018

(65) Prior Publication Data

US 2018/0276967 A1 Sep. 27, 2018

Related U.S. Application Data

(63) Continuation of application No. 15/500,575, filed as application No. PCT/JP2015/071490 on Jul. 29, 2015, now Pat. No. 10,013,862.

(30) Foreign Application Priority Data

Aug. 20, 2014 (JP) ................................ 2014-167610

(51) Int. Cl.
*G08B 21/02* (2006.01)
*G08B 25/04* (2006.01)
(Continued)

(52) U.S. Cl.
CPC ............. *G08B 21/02* (2013.01); *G08B 25/04* (2013.01); *G08B 25/10* (2013.01); *H04M 1/00* (2013.01);
(Continued)

(58) Field of Classification Search
CPC ..... G08B 21/02; G08B 25/10; H04M 1/7253; H04M 1/725; H04R 25/554;
(Continued)

(56) References Cited

U.S. PATENT DOCUMENTS 2,045,404 A 6/1936 Nicholides
4,351,166 A 9/1982 Belin
(Continued)

FOREIGN PATENT DOCUMENTS

CN 2198618 5/1995
CN 1110857 10/1995
(Continued)

OTHER PUBLICATIONS

Japanese Patent Office, International Search Report for PCT/JP2013/067781 dated Oct. 1, 2013 (with English translation).
(Continued)

*Primary Examiner* — Hung T Nguyen
(74) *Attorney, Agent, or Firm* — Fish & Richardson P.C.

(57) ABSTRACT

This watching system is provided with: a watching detection device that is provided with a cartilage conduction vibration source, a mastication sensor, and a bone conduction microphone and that is configured to be mounted on an ear such that the entry of the ear canal is opened; and a mobile phone or an in-home monitoring unit that receives watching detection signals from the mastication sensor and the bone conduction microphone by means of short-range communication and issues a notification to the outside. The watching detection device has an air conduction microphone and also functions as a hearing aid. When detection signals cannot be received from the mastication sensor or the bone conduction microphone for a predetermined time period, a notification is issued. The mobile phone and the in-home monitoring unit crosscheck watching detection information. The mobile
(Continued)

phone also issues a notification of information indicating that there is no abnormality.

9 Claims, 8 Drawing Sheets

(51) Int. Cl.

| | |
|---|---|
| ***H04M 1/00*** | (2006.01) |
| ***H04R 1/00*** | (2006.01) |
| ***H04R 1/02*** | (2006.01) |
| ***H04R 1/10*** | (2006.01) |
| ***H04R 3/00*** | (2006.01) |
| ***H04R 25/00*** | (2006.01) |
| ***G08B 25/10*** | (2006.01) |
| ***H04M 1/725*** | (2006.01) |

(52) U.S. Cl.
CPC ............ *H04M 1/7253* (2013.01); *H04R 1/00* (2013.01); *H04R 1/02* (2013.01); *H04R 1/10* (2013.01); *H04R 3/00* (2013.01); *H04R 25/00* (2013.01); *H04R 25/554* (2013.01); *H04R 25/606* (2013.01); *H04R 2460/13* (2013.01)

(58) Field of Classification Search
CPC .............. H04R 25/606; H04R 2460/00; H04R 2460/13; H04R 25/00; H04W 88/02; H04B 7/00
USPC ............. 340/539.1, 539.11, 573.1; 455/41.2, 455/41.3, 575.2, 569.1
See application file for complete search history.

(56) References Cited

U.S. PATENT DOCUMENTS

| | | | |
|---|---|---|---|
| 5,295,193 | A | 3/1994 | Ono |
| 5,323,468 | A | 6/1994 | Bottesch |
| 5,396,563 | A | 3/1995 | Yoshimi |
| 5,682,173 | A | 10/1997 | Holakovszky et al. |
| 5,687,244 | A | 11/1997 | Untersander |
| 5,956,682 | A | 9/1999 | Loudermilk |
| 6,028,556 | A | 2/2000 | Shiraki |
| 6,380,923 | B1 | 4/2002 | Fukumoto et al. |
| 6,456,721 | B1 | 9/2002 | Fukuda |
| 6,463,157 | B1 | 10/2002 | May |
| 6,483,917 | B1 | 11/2002 | Kang et al. |
| 6,825,830 | B1 | 11/2004 | Kanesaka et al. |
| 6,912,287 | B1 | 6/2005 | Fukumoto et al. |
| 6,950,126 | B1 | 9/2005 | Homma et al. |
| 7,231,235 | B2 | 6/2007 | Harrold |
| 7,257,372 | B2 | 8/2007 | Kaltenbach |
| 7,437,122 | B2 | 10/2008 | Choi |
| 7,442,164 | B2 | 10/2008 | Berrang et al. |
| 7,555,136 | B2 | 6/2009 | Wang |
| 7,616,771 | B2 | 11/2009 | Lenhardt |
| 7,822,215 | B2 | 10/2010 | Carazo |
| 7,890,147 | B2 | 2/2011 | Tanada |
| 8,433,080 | B2 | 4/2013 | Rader |
| 8,521,239 | B2 | 8/2013 | Hosoi et al. |
| 8,526,646 | B2 | 9/2013 | Boesen |
| 8,532,322 | B2 | 9/2013 | Parker |
| 8,886,263 | B2 | 11/2014 | Hosoi et al. |
| 8,918,149 | B2 | 12/2014 | Hosoi et al. |
| 9,020,168 | B2 | 4/2015 | Karkkainen |
| 9,020,170 | B2 | 4/2015 | Hosoi et al. |
| 9,313,306 | B2 | 4/2016 | Hosoi et al. |
| 9,351,090 | B2 * | 5/2016 | Tachibana ............ H04R 1/1041 |
| 9,565,285 | B2 * | 2/2017 | Theverapperuma .... H04W 4/80 |
| 2001/0011951 | A1 | 8/2001 | Kimata et al. |
| 2001/0026626 | A1 | 10/2001 | Athanas |
| 2002/0001381 | A1 | 1/2002 | Mori |
| 2002/0012441 | A1 | 1/2002 | Matsunaga et al. |
| 2002/0068995 | A1 | 6/2002 | Yoshida |
| 2002/0114214 | A1 | 8/2002 | Hansen et al. |
| 2002/0115478 | A1 | 8/2002 | Fujisawa et al. |
| 2002/0149561 | A1 | 10/2002 | Fukumoto et al. |
| 2002/0183014 | A1 | 12/2002 | Takeda et al. |
| 2003/0064758 | A1 | 4/2003 | Mizuta et al. |
| 2003/0108209 | A1 | 6/2003 | McIntosh |
| 2003/0118197 | A1 | 6/2003 | Nagayasu et al. |
| 2003/0119566 | A1 | 6/2003 | Chen |
| 2003/0174856 | A1 | 9/2003 | Johannsen et al. |
| 2004/0013279 | A1 | 1/2004 | Takeda |
| 2004/0048633 | A1 | 3/2004 | Sato et al. |
| 2004/0086149 | A1 | 5/2004 | Johannsen et al. |
| 2004/0087346 | A1 | 5/2004 | Johannsen et al. |
| 2004/0105566 | A1 | 6/2004 | Matsunaga et al. |
| 2004/0131211 | A1 | 7/2004 | Miyata et al. |
| 2004/0132509 | A1 | 7/2004 | Glezerman |
| 2004/0137963 | A1 | 7/2004 | Barras et al. |
| 2004/0189151 | A1 | 9/2004 | Athanas |
| 2004/0207542 | A1 | 10/2004 | Chang et al. |
| 2004/0259513 | A1 | 12/2004 | Park |
| 2005/0031152 | A1 | 2/2005 | Hansen et al. |
| 2005/0046790 | A1 | 3/2005 | Jannard et al. |
| 2005/0088530 | A1 | 4/2005 | Homma et al. |
| 2005/0129257 | A1 | 6/2005 | Tamura |
| 2005/0160270 | A1 | 7/2005 | Goldberg |
| 2005/0176459 | A1 | 8/2005 | Fukuda |
| 2005/0184875 | A1 | 8/2005 | Schmandt et al. |
| 2005/0185813 | A1 | 8/2005 | Sinclair et al. |
| 2005/0207599 | A1 | 9/2005 | Fukumoto et al. |
| 2005/0213432 | A1 | 9/2005 | Hoshuyama |
| 2005/0232436 | A1 | 10/2005 | Nagayasu et al. |
| 2005/0237685 | A1 | 10/2005 | Miyata |
| 2005/0244020 | A1 | 11/2005 | Nakajima et al. |
| 2005/0260969 | A1 | 11/2005 | Nagata et al. |
| 2005/0275714 | A1 | 12/2005 | Ishikawa et al. |
| 2005/0276164 | A1 | 12/2005 | Amron |
| 2005/0286734 | A1 | 12/2005 | Wang |
| 2006/0079291 | A1 | 4/2006 | Granovetter et al. |
| 2006/0093161 | A1 | 5/2006 | Falcon |
| 2006/0094464 | A1 | 5/2006 | Kyou et al. |
| 2006/0113932 | A1 | 6/2006 | Mori et al. |
| 2006/0120546 | A1 | 6/2006 | Tanaka et al. |
| 2006/0121960 | A1 | 6/2006 | Wang |
| 2006/0140439 | A1 | 6/2006 | Nakagawa |
| 2006/0158064 | A1 | 7/2006 | Asakawa et al. |
| 2006/0159297 | A1 | 7/2006 | Wirola et al. |
| 2006/0171107 | A1 | 8/2006 | Yamamoto et al. |
| 2006/0215873 | A1 | 9/2006 | Hansen et al. |
| 2006/0216022 | A1 | 9/2006 | Lee et al. |
| 2006/0227984 | A1 | 10/2006 | Sinclair |
| 2006/0262951 | A1 | 11/2006 | Jun |
| 2006/0286998 | A1 | 12/2006 | Fukuda |
| 2007/0003098 | A1 | 1/2007 | Martenson |
| 2007/0014423 | A1 | 1/2007 | Darbut et al. |
| 2007/0015467 | A1 | 1/2007 | Nagayasu et al. |
| 2007/0019452 | A1 | 1/2007 | Ohkubo et al. |
| 2007/0025574 | A1 | 2/2007 | Azima et al. |
| 2007/0036370 | A1 | 2/2007 | Granovetter et al. |
| 2007/0053530 | A1 | 3/2007 | Ochiai et al. |
| 2007/0057601 | A1 | 3/2007 | Kawase et al. |
| 2007/0080951 | A1 | 4/2007 | Maruyama et al. |
| 2007/0081679 | A1 | 4/2007 | Suzuki et al. |
| 2007/0098200 | A1 | 5/2007 | Takei |
| 2007/0160253 | A1 | 7/2007 | Takei et al. |
| 2007/0249395 | A1 | 10/2007 | Kondo et al. |
| 2007/0263893 | A1 | 11/2007 | Kim |
| 2007/0269777 | A1 | 11/2007 | Fux |
| 2007/0297637 | A1 | 12/2007 | Sugiyama |
| 2008/0008344 | A1 | 1/2008 | Wakabayashi et al. |
| 2008/0054862 | A1 | 3/2008 | Hara |
| 2008/0106449 | A1 | 5/2008 | Doi |
| 2008/0107290 | A1 | 5/2008 | Tamura |
| 2008/0107300 | A1 | 5/2008 | Chen |
| 2008/0123893 | A1 | 5/2008 | Lee |
| 2008/0129703 | A1 | 6/2008 | Takeshita et al. |
| 2008/0139254 | A1 | 6/2008 | Levy |
| 2008/0143512 | A1 | 6/2008 | Wakisaka et al. |
| 2008/0170725 | A1 | 7/2008 | Asada et al. |
| 2008/0205679 | A1 | 8/2008 | Darbut et al. |

(56) References Cited

U.S. PATENT DOCUMENTS

| | | | |
|---|---|---|---|
| 2008/0227490 | A1 | 9/2008 | Homma et al. |
| 2008/0227501 | A1 | 9/2008 | Joe et al. |
| 2008/0239061 | A1 | 10/2008 | Cok et al. |
| 2008/0240465 | A1 | 10/2008 | Shiraishi |
| 2008/0247562 | A1 | 10/2008 | Nagayasu et al. |
| 2008/0267433 | A1 | 10/2008 | Katou et al. |
| 2008/0297373 | A1 | 12/2008 | Hayakawa et al. |
| 2008/0319250 | A1 | 12/2008 | Asnes |
| 2009/0002626 | A1 | 1/2009 | Wakabayashi |
| 2009/0028356 | A1 | 1/2009 | Ambrose et al. |
| 2009/0069045 | A1 | 3/2009 | Cheng |
| 2009/0093283 | A1 | 4/2009 | Mizuta et al. |
| 2009/0129620 | A1 | 5/2009 | Tagawa et al. |
| 2009/0245556 | A1 | 10/2009 | Parker et al. |
| 2009/0245557 | A1 | 10/2009 | Parker |
| 2009/0288489 | A1 | 11/2009 | Lee et al. |
| 2009/0290730 | A1 | 11/2009 | Fukuda et al. |
| 2009/0304210 | A1 | 12/2009 | Weisman |
| 2009/0323976 | A1 | 12/2009 | Asada et al. |
| 2010/0056227 | A1 | 3/2010 | Hayakawa et al. |
| 2010/0061582 | A1 | 3/2010 | Takigawa et al. |
| 2010/0061584 | A1 | 3/2010 | Lin et al. |
| 2010/0098269 | A1 | 4/2010 | Abolfathi et al. |
| 2010/0150368 | A1 | 6/2010 | Chang et al. |
| 2010/0172519 | A1 | 7/2010 | Kimura et al. |
| 2010/0178597 | A1 | 7/2010 | Ishida et al. |
| 2010/0178957 | A1 | 7/2010 | Chen |
| 2010/0184487 | A1 | 7/2010 | Takada |
| 2010/0216526 | A1 | 8/2010 | Chen et al. |
| 2010/0238108 | A1 | 9/2010 | Rekimoto |
| 2010/0245585 | A1* | 9/2010 | Fisher ................. H04M 1/6066 348/164 |
| 2010/0246878 | A1 | 9/2010 | Sim |
| 2010/0254562 | A1 | 10/2010 | Koo |
| 2010/0310086 | A1 | 12/2010 | Magrath et al. |
| 2010/0311462 | A1 | 12/2010 | Endo et al. |
| 2010/0320961 | A1 | 12/2010 | Castillo |
| 2010/0322127 | A1 | 12/2010 | Nakajima |
| 2010/0328033 | A1 | 12/2010 | Kamei |
| 2010/0329485 | A1 | 12/2010 | Fukuda et al. |
| 2011/0028190 | A1 | 2/2011 | Mizuta et al. |
| 2011/0059769 | A1 | 3/2011 | Brunolli |
| 2011/0143769 | A1 | 6/2011 | Jones et al. |
| 2011/0143819 | A1 | 6/2011 | Sugiyama et al. |
| 2011/0158425 | A1 | 6/2011 | Hayakawa |
| 2011/0159855 | A1 | 6/2011 | Cheng |
| 2011/0169622 | A1 | 7/2011 | Billmaier |
| 2011/0170718 | A1 | 7/2011 | Fukuda et al. |
| 2011/0180542 | A1 | 7/2011 | Drollinger et al. |
| 2011/0201301 | A1 | 8/2011 | Okada et al. |
| 2011/0224481 | A1 | 9/2011 | Lee et al. |
| 2011/0237306 | A1 | 9/2011 | Kamii |
| 2011/0254616 | A1 | 10/2011 | Kawano |
| 2011/0263200 | A1 | 10/2011 | Thornton et al. |
| 2011/0267551 | A1 | 11/2011 | Yokote et al. |
| 2011/0280416 | A1 | 11/2011 | Abolfathi et al. |
| 2011/0281617 | A1 | 11/2011 | Kim et al. |
| 2011/0293105 | A1 | 12/2011 | Arie et al. |
| 2011/0293133 | A1 | 12/2011 | Yan |
| 2011/0299695 | A1 | 12/2011 | Nicholson |
| 2011/0301729 | A1 | 12/2011 | Heiman et al. |
| 2012/0008793 | A1 | 1/2012 | Knox et al. |
| 2012/0008807 | A1 | 1/2012 | Gran |
| 2012/0010735 | A1 | 1/2012 | Gilboa |
| 2012/0028679 | A1 | 2/2012 | Ozasa |
| 2012/0082329 | A1 | 4/2012 | Neumeyer |
| 2012/0082335 | A1 | 4/2012 | Duisters et al. |
| 2012/0105192 | A1 | 5/2012 | Norieda |
| 2012/0130660 | A1 | 5/2012 | Neumeyer |
| 2012/0133213 | A1 | 5/2012 | Borke et al. |
| 2012/0139750 | A1 | 6/2012 | Hayakawa et al. |
| 2012/0140917 | A1 | 6/2012 | Nicholson et al. |
| 2012/0162143 | A1 | 6/2012 | Kai et al. |
| 2012/0182429 | A1 | 7/2012 | Forutanpour et al. |
| 2012/0183163 | A1 | 7/2012 | Apfel |
| 2012/0219161 | A1 | 8/2012 | Amada |
| 2012/0221329 | A1 | 8/2012 | Harsch |
| 2012/0237075 | A1 | 9/2012 | East et al. |
| 2012/0238908 | A1 | 9/2012 | Osako et al. |
| 2012/0244917 | A1 | 9/2012 | Hosoi et al. |
| 2012/0249223 | A1 | 10/2012 | Neugebauer |
| 2012/0253236 | A1 | 10/2012 | Snow |
| 2012/0283746 | A1 | 11/2012 | Hu et al. |
| 2012/0289162 | A1 | 11/2012 | Hosoi et al. |
| 2012/0298441 | A1 | 11/2012 | Lin et al. |
| 2012/0300956 | A1 | 11/2012 | Horii |
| 2012/0330654 | A1 | 12/2012 | Angell |
| 2013/0039508 | A1 | 2/2013 | Chen et al. |
| 2013/0051585 | A1 | 2/2013 | Karkkainen |
| 2013/0100596 | A1 | 4/2013 | Yokote et al. |
| 2013/0111346 | A1 | 5/2013 | Little |
| 2013/0120311 | A1 | 5/2013 | Ichikawa |
| 2013/0129121 | A1 | 5/2013 | Yamashita |
| 2013/0136279 | A1 | 5/2013 | Brown |
| 2013/0142348 | A1 | 6/2013 | Weisman |
| 2013/0169352 | A1 | 7/2013 | Kawano |
| 2013/0169829 | A1 | 7/2013 | Homma et al. |
| 2013/0177188 | A1* | 7/2013 | Apfel .................. H04R 25/558 381/315 |
| 2013/0180033 | A1 | 7/2013 | Uemoto et al. |
| 2013/0191114 | A1 | 7/2013 | Gim |
| 2013/0236043 | A1 | 9/2013 | Abolfathi et al. |
| 2013/0242262 | A1 | 9/2013 | Lewis |
| 2013/0242809 | A1 | 9/2013 | Tone et al. |
| 2013/0252675 | A1 | 9/2013 | Nicholson |
| 2013/0259221 | A1 | 10/2013 | Shusaku et al. |
| 2013/0293373 | A1 | 11/2013 | Gegner et al. |
| 2013/0301860 | A1 | 11/2013 | Neumeyer et al. |
| 2013/0308799 | A1 | 11/2013 | Lin et al. |
| 2013/0316691 | A1 | 11/2013 | Forutanpour et al. |
| 2013/0322670 | A1 | 12/2013 | Hosoi et al. |
| 2013/0324193 | A1 | 12/2013 | Hosoi et al. |
| 2013/0335210 | A1 | 12/2013 | Arai et al. |
| 2013/0336507 | A1 | 12/2013 | Gran |
| 2014/0003641 | A1 | 1/2014 | Neumeyer et al. |
| 2014/0205131 | A1 | 6/2014 | Azmi et al. |
| 2014/0313280 | A1 | 10/2014 | Takuno et al. |
| 2014/0342783 | A1 | 11/2014 | Suzuki et al. |
| 2014/0355792 | A1 | 12/2014 | Nabata |
| 2014/0378191 | A1 | 12/2014 | Hosoi et al. |
| 2015/0022438 | A1 | 1/2015 | Hong |
| 2015/0023527 | A1 | 1/2015 | Sato |
| 2015/0043748 | A1 | 2/2015 | Sudo |
| 2015/0043758 | A1 | 2/2015 | Yamada |
| 2015/0054779 | A1 | 2/2015 | Horii et al. |
| 2015/0065057 | A1 | 3/2015 | Hosoi et al. |
| 2015/0070083 | A1 | 3/2015 | Kawano |
| 2015/0078569 | A1 | 3/2015 | Magrath et al. |
| 2015/0086047 | A1 | 3/2015 | Horii et al. |
| 2015/0110318 | A1 | 4/2015 | Miyano |
| 2015/0131816 | A1 | 5/2015 | Inagaki |
| 2015/0131838 | A1 | 5/2015 | Horii |
| 2015/0141088 | A1 | 5/2015 | Hosoi et al. |
| 2015/0156295 | A1 | 6/2015 | Kazama |
| 2015/0172588 | A1 | 6/2015 | Homma et al. |
| 2015/0181338 | A1 | 6/2015 | Hosoi et al. |
| 2015/0208153 | A1 | 7/2015 | Hosoi et al. |
| 2015/0256656 | A1 | 9/2015 | Horii |
| 2015/0256946 | A1 | 9/2015 | Neumeyer et al. |
| 2016/0007109 | A1 | 1/2016 | Neumeyer et al. |
| 2016/0073202 | A1 | 3/2016 | Nabata et al. |
| 2016/0086594 | A1 | 3/2016 | Asada et al. |
| 2016/0205233 | A1 | 7/2016 | Hosoi et al. |
| 2016/0248894 | A1 | 8/2016 | Hosoi et al. |
| 2016/0261299 | A1 | 9/2016 | Hosoi et al. |
| 2016/0286296 | A1 | 9/2016 | Hosoi et al. |
| 2016/0349803 | A1 | 12/2016 | Dusan |
| 2017/0006144 | A1 | 1/2017 | Hosoi et al. |
| 2017/0026727 | A1 | 1/2017 | Hosoi et al. |
| 2017/0213452 | A1 | 7/2017 | Brunolli |
| 2017/0230754 | A1 | 8/2017 | Dusan |
| 2017/0295269 | A1 | 10/2017 | Hosoi |
| 2017/0302320 | A1 | 10/2017 | Hosoi et al. |

(56) References Cited

U.S. PATENT DOCUMENTS

| | | | |
|---|---|---|---|
| 2018/0124222 | A1 | 5/2018 | Hosoi et al. |
| 2018/0199127 | A1 | 7/2018 | Hosoi et al. |
| 2018/0262839 | A1 | 7/2018 | Hosoi et al. |

FOREIGN PATENT DOCUMENTS

| | | | |
|---|---|---|---|
| CN | 1276142 | | 12/2000 |
| CN | 1411253 | | 4/2003 |
| CN | 2575916 | Y | 9/2003 |
| CN | 1141856 | | 3/2004 |
| CN | 1627864 | | 6/2005 |
| CN | 1672114 | | 9/2005 |
| CN | 1679371 | | 10/2005 |
| CN | 1723733 | | 1/2006 |
| CN | 1791283 | | 6/2006 |
| CN | 2800681 | Y | 7/2006 |
| CN | 1843019 | | 10/2006 |
| CN | 1984505 | | 6/2007 |
| CN | 101022678 | | 8/2007 |
| CN | 201035260 | | 3/2008 |
| CN | 101267463 | | 9/2008 |
| CN | 101277331 | | 10/2008 |
| CN | 101355823 | | 1/2009 |
| CN | 101360140 | | 2/2009 |
| CN | 101390440 | | 3/2009 |
| CN | 201216023 | | 4/2009 |
| CN | 101513081 | | 8/2009 |
| CN | 101795143 | | 8/2010 |
| CN | 101897198 | | 11/2010 |
| CN | 102075633 | | 5/2011 |
| CN | 201845183 | U | 5/2011 |
| CN | 102670206 | | 9/2012 |
| CN | 102959930 | | 3/2013 |
| CN | 203039851 | | 7/2013 |
| CN | 103281953 | | 9/2013 |
| CN | 203181220 | | 9/2013 |
| CN | 103999480 | | 8/2014 |
| EP | 1705875 | | 3/2005 |
| EP | 1705075 | | 9/2006 |
| EP | 1705874 | | 9/2006 |
| EP | 1783919 | | 5/2007 |
| EP | 1970792 | | 9/2008 |
| EP | 2388981 | | 11/2011 |
| JP | S51-94220 | | 8/1976 |
| JP | S55-088497 | | 7/1980 |
| JP | S56-17780 | | 2/1981 |
| JP | 2013-061176 | | 7/1981 |
| JP | S56-089086 | | 7/1981 |
| JP | S5690018 | | 7/1981 |
| JP | S58-182398 | | 10/1983 |
| JP | S60116800 | | 8/1985 |
| JP | S62-208680 | | 9/1987 |
| JP | S63-115728 | | 7/1988 |
| JP | 63-142981 | | 9/1988 |
| JP | S63140753 | | 9/1988 |
| JP | H0212099 | | 1/1990 |
| JP | H02-62199 | | 3/1990 |
| JP | 2-182098 | | 7/1990 |
| JP | 3-29424 | | 2/1991 |
| JP | H03117995 | | 12/1991 |
| JP | 4-90298 | | 3/1992 |
| JP | H0573073 | | 3/1993 |
| JP | H05-41297 | | 6/1993 |
| JP | H05-183618 | | 7/1993 |
| JP | H05-207579 | | 8/1993 |
| JP | H05-292167 | | 11/1993 |
| JP | 06-030494 | | 2/1994 |
| JP | 3003950 | | 8/1994 |
| JP | 3009206 | | 1/1995 |
| JP | 07-107146 | | 4/1995 |
| JP | 07-131268 | | 5/1995 |
| JP | H7-039150 | | 7/1995 |
| JP | H07210176 | | 8/1995 |
| JP | 08-033026 | | 2/1996 |
| JP | H879338 | | 3/1996 |
| JP | 8-102780 | | 4/1996 |
| JP | H08-090986 | | 4/1996 |
| JP | H08111703 | | 4/1996 |
| JP | 08-237185 | | 9/1996 |
| JP | H08-256080 | | 10/1996 |
| JP | H09-023256 | | 1/1997 |
| JP | H10-042021 | | 2/1998 |
| JP | 3050147 | | 4/1998 |
| JP | 10-136480 | | 5/1998 |
| JP | H10-200608 | | 7/1998 |
| JP | 10-227 | U | 9/1998 |
| JP | H11112672 | | 4/1999 |
| JP | H11-163980 | | 6/1999 |
| JP | 3064055 | | 9/1999 |
| JP | 11-298595 | | 10/1999 |
| JP | H11-352138 | | 12/1999 |
| JP | 2000-013294 | | 1/2000 |
| JP | 2000-031858 | | 1/2000 |
| JP | 2000-49935 | | 2/2000 |
| JP | 3070222 | | 4/2000 |
| JP | 2000-217015 | | 8/2000 |
| JP | 2000-295696 | | 10/2000 |
| JP | 2000-322186 | | 11/2000 |
| JP | 2000-324217 | | 11/2000 |
| JP | 2001-125742 | | 5/2001 |
| JP | 2001-169016 | | 6/2001 |
| JP | 2001-177809 | | 6/2001 |
| JP | 2001-268211 | | 9/2001 |
| JP | 2001-287183 | | 10/2001 |
| JP | 2001287183 | | 10/2001 |
| JP | 2001-320790 | | 11/2001 |
| JP | 2001-333161 | | 11/2001 |
| JP | 2001-339504 | | 12/2001 |
| JP | 2001-352395 | | 12/2001 |
| JP | 2002-016720 | | 1/2002 |
| JP | 2002-036158 | | 2/2002 |
| JP | 2002-041411 | | 2/2002 |
| JP | 2002036158 | | 2/2002 |
| JP | 2002041411 | | 2/2002 |
| JP | 2002051111 | | 2/2002 |
| JP | 2002-84575 | | 3/2002 |
| JP | 2002-111822 | | 4/2002 |
| JP | 2002-149312 | | 5/2002 |
| JP | 2002-164986 | | 6/2002 |
| JP | 2002-171321 | | 6/2002 |
| JP | 2002-223475 | | 8/2002 |
| JP | 2002-238262 | | 8/2002 |
| JP | 2002-262377 | | 9/2002 |
| JP | 3090729 | | 10/2002 |
| JP | 2002-359889 | | 12/2002 |
| JP | 2002-368839 | | 12/2002 |
| JP | 2003-032343 | | 1/2003 |
| JP | 2003-032768 | | 1/2003 |
| JP | 2003-037651 | | 2/2003 |
| JP | 2003-037885 | | 2/2003 |
| JP | 2003-101625 | | 4/2003 |
| JP | 2003-102094 | | 4/2003 |
| JP | 2003-103220 | | 4/2003 |
| JP | 2003-111175 | | 4/2003 |
| JP | 2003-125473 | | 4/2003 |
| JP | 2003-143253 | | 5/2003 |
| JP | 2003-145048 | | 5/2003 |
| JP | 2003-169115 | | 6/2003 |
| JP | 2003-173375 | | 6/2003 |
| JP | 2003-179988 | | 6/2003 |
| JP | 2003173375 | A * | 6/2003 ............ G06F 17/60 |
| JP | 2003-198719 | | 7/2003 |
| JP | 2003-211087 | | 7/2003 |
| JP | 2003-218989 | | 7/2003 |
| JP | 2003188985 | | 7/2003 |
| JP | 2003-274376 | | 9/2003 |
| JP | 2003-274470 | | 9/2003 |
| JP | 2003-300015 | | 10/2003 |
| JP | 2003-304308 | | 10/2003 |
| JP | 2003-319022 | | 11/2003 |
| JP | 2003-348208 | | 12/2003 |
| JP | 2004-064457 | | 2/2004 |
| JP | 2004-094389 | | 3/2004 |
| JP | 2004-128915 | | 4/2004 |

(56) References Cited

FOREIGN PATENT DOCUMENTS

| | | |
|---|---|---|
| JP | 2004-157873 | 6/2004 |
| JP | 2004-158961 | 6/2004 |
| JP | 2004-173018 | 6/2004 |
| JP | 2004-173264 | 6/2004 |
| JP | 2004-187031 | 7/2004 |
| JP | 2004-190699 | 7/2004 |
| JP | 2004-205839 | 7/2004 |
| JP | 2004-208220 | 7/2004 |
| JP | 2004-233316 | 8/2004 |
| JP | 2004-252626 | 9/2004 |
| JP | 2004-266321 | 9/2004 |
| JP | 2004-274438 | 9/2004 |
| JP | 2004-357198 | 12/2004 |
| JP | 2005-020234 | 1/2005 |
| JP | 2005-020730 | 1/2005 |
| JP | 2005072643 | 3/2005 |
| JP | 2005-311125 | 4/2005 |
| JP | 2005-512440 | 4/2005 |
| JP | 2005-142729 | 6/2005 |
| JP | 2005-142835 | 6/2005 |
| JP | 2005-159969 | 6/2005 |
| JP | 2005151292 | 6/2005 |
| JP | 2005184267 | 7/2005 |
| JP | 2005-223717 | 8/2005 |
| JP | 2005/229324 | 8/2005 |
| JP | 2005-229324 | 8/2005 |
| JP | 2005-237026 | 9/2005 |
| JP | 2005-244968 | 9/2005 |
| JP | 2005-328125 | 11/2005 |
| JP | 2005-534269 | 11/2005 |
| JP | 2005-340927 | 12/2005 |
| JP | 2005-341543 | 12/2005 |
| JP | 2005-348193 | 12/2005 |
| JP | 2005-352024 | 12/2005 |
| JP | 2006-005625 | 1/2006 |
| JP | 2006-007342 | 1/2006 |
| JP | 2006-007919 | 1/2006 |
| JP | 2006-011591 | 1/2006 |
| JP | 2006-019812 | 1/2006 |
| JP | 2006007342 | 1/2006 |
| JP | 2006-050056 | 2/2006 |
| JP | 2006-051300 | 2/2006 |
| JP | 2006-066972 | 3/2006 |
| JP | 2006-067049 | 3/2006 |
| JP | 2006-074671 | 3/2006 |
| JP | 2006-086581 | 3/2006 |
| JP | 2006-094158 | 4/2006 |
| JP | 2006-109326 | 4/2006 |
| JP | 2006-115060 | 4/2006 |
| JP | 2006-115476 | 4/2006 |
| JP | 2006-129117 | 5/2006 |
| JP | 2006-129404 | 5/2006 |
| JP | 2006-148295 | 6/2006 |
| JP | 2006-155734 | 6/2006 |
| JP | 2006-157226 | 6/2006 |
| JP | 2006-157318 | 6/2006 |
| JP | 2006-165702 | 6/2006 |
| JP | 2006-166128 | 6/2006 |
| JP | 2006-166300 | 6/2006 |
| JP | 2006/186691 | 7/2006 |
| JP | 2006-197267 | 7/2006 |
| JP | 2006-197404 | 7/2006 |
| JP | 2006-211317 | 8/2006 |
| JP | 2006-217088 | 8/2006 |
| JP | 2006-226506 | 8/2006 |
| JP | 2006-229647 | 8/2006 |
| JP | 2006217321 | 8/2006 |
| JP | 2006-238072 | 9/2006 |
| JP | 2006-295786 | 10/2006 |
| JP | 2006283541 | 10/2006 |
| JP | 2006-303618 | 11/2006 |
| JP | 2006-333058 | 12/2006 |
| JP | 2006-345025 | 12/2006 |
| JP | 2006-345471 | 12/2006 |
| JP | 2006339914 | 12/2006 |

| | | |
|---|---|---|
| JP | 2007-003702 | 1/2007 |
| JP | 2007-006369 | 1/2007 |
| JP | 2007/010518 | 1/2007 |
| JP | 2007-019898 | 1/2007 |
| JP | 2007-019957 | 1/2007 |
| JP | 2007-020051 | 1/2007 |
| JP | 2007-028469 | 2/2007 |
| JP | 2007-051007 | 3/2007 |
| JP | 2007-051395 | 3/2007 |
| JP | 2007-072015 | 3/2007 |
| JP | 2007-081276 | 3/2007 |
| JP | 2007074663 | 3/2007 |
| JP | 2007505540 | 3/2007 |
| JP | 2007-096386 | 4/2007 |
| JP | 2007-103989 | 4/2007 |
| JP | 2007-104548 | 4/2007 |
| JP | 2007-104603 | 4/2007 |
| JP | 2007-129740 | 5/2007 |
| JP | 2007-133698 | 5/2007 |
| JP | 2007-142920 | 6/2007 |
| JP | 2007-165938 | 6/2007 |
| JP | 2007-180827 | 7/2007 |
| JP | 2007-189578 | 7/2007 |
| JP | 2007-195239 | 8/2007 |
| JP | 2007-214883 | 8/2007 |
| JP | 2007-228508 | 9/2007 |
| JP | 2007-268028 | 10/2007 |
| JP | 2007-275819 | 10/2007 |
| JP | 2007-281916 | 10/2007 |
| JP | 2007-306465 | 11/2007 |
| JP | 2007-307124 | 11/2007 |
| JP | 2007-330560 | 12/2007 |
| JP | 2007-336418 | 12/2007 |
| JP | 2008-000709 | 1/2008 |
| JP | 2008-006558 | 1/2008 |
| JP | 2008-017327 | 1/2008 |
| JP | 2008-017398 | 1/2008 |
| JP | 2008006558 | 1/2008 |
| JP | 2008-042324 | 2/2008 |
| JP | 2008-046844 | 2/2008 |
| JP | 2008-085417 | 4/2008 |
| JP | 2008-092164 | 4/2008 |
| JP | 2008-092313 | 4/2008 |
| JP | 2008-511217 | 4/2008 |
| JP | 2008-121796 | 5/2008 |
| JP | 2008-135991 | 6/2008 |
| JP | 2008-141589 | 6/2008 |
| JP | 2008-141687 | 6/2008 |
| JP | 2008-148086 | 6/2008 |
| JP | 2008-149427 | 7/2008 |
| JP | 2008-153783 | 7/2008 |
| JP | 2008-177705 | 7/2008 |
| JP | 2008149427 | 7/2008 |
| JP | 2008177629 | 7/2008 |
| JP | 3144392 | 8/2008 |
| JP | 2008-227123 | 9/2008 |
| JP | 2008-227806 | 9/2008 |
| JP | 2008-229531 | 10/2008 |
| JP | 2008-263383 | 10/2008 |
| JP | 2008-301071 | 12/2008 |
| JP | 2009010593 | 1/2009 |
| JP | 2009-044510 | 2/2009 |
| JP | 2009-077260 | 4/2009 |
| JP | 2009-088942 | 4/2009 |
| JP | 2009-094986 | 4/2009 |
| JP | 2009-22261 | 5/2009 |
| JP | 2009-111820 | 5/2009 |
| JP | 2009-117953 | 5/2009 |
| JP | 2009-118396 | 5/2009 |
| JP | 2009-147680 | 7/2009 |
| JP | 2009-159402 | 7/2009 |
| JP | 2009-159577 | 7/2009 |
| JP | 2009-166213 | 7/2009 |
| JP | 2009-171249 | 7/2009 |
| JP | 2009166213 | 7/2009 |
| JP | 4307488 | 8/2009 |
| JP | 2009-207056 | 10/2009 |
| JP | 2009-232443 | 10/2009 |
| JP | 2009-246954 | 10/2009 |

(56) References Cited

FOREIGN PATENT DOCUMENTS

| | | | | |
|---|---|---|---|---|
| JP | 2009-260883 | | 11/2009 | |
| JP | 2009-267616 | | 11/2009 | |
| JP | 2009-542038 | | 11/2009 | |
| JP | 2010-010945 | | 1/2010 | |
| JP | 2010011117 | | 1/2010 | |
| JP | 2010-068299 | | 3/2010 | |
| JP | 2010054731 | | 3/2010 | |
| JP | 2010-094799 | | 4/2010 | |
| JP | 2010087810 | | 4/2010 | |
| JP | 2010-109795 | | 5/2010 | |
| JP | 2010-124287 | | 6/2010 | |
| JP | 2010-147727 | | 7/2010 | |
| JP | 2010-166406 | | 7/2010 | |
| JP | 2010-524295 | | 7/2010 | |
| JP | 4541111 | | 7/2010 | |
| JP | 2010-528547 | | 8/2010 | |
| JP | 2010-207963 | | 9/2010 | |
| JP | 2010207963 | | 9/2010 | |
| JP | 2010-245854 | | 10/2010 | |
| JP | 2010232755 | | 10/2010 | |
| JP | 2010-258701 | | 11/2010 | |
| JP | 2010-268336 | | 11/2010 | |
| JP | 2010283541 | | 12/2010 | |
| JP | 2011-004195 | | 1/2011 | |
| JP | 2011-008503 | | 1/2011 | |
| JP | 2011-010791 | | 1/2011 | |
| JP | 2011-015193 | | 1/2011 | |
| JP | 2011-017969 | | 1/2011 | |
| JP | 2011-035560 | | 2/2011 | |
| JP | 2011-048697 | | 3/2011 | |
| JP | 2011-053744 | | 3/2011 | |
| JP | 2011-059376 | | 3/2011 | |
| JP | 2011-087142 | | 4/2011 | |
| JP | 2011-512745 | | 4/2011 | |
| JP | 2011-130334 | | 6/2011 | |
| JP | 2011114454 | | 6/2011 | |
| JP | 2011-139439 | | 7/2011 | |
| JP | 2011-139462 | | 7/2011 | |
| JP | 2011135489 | | 7/2011 | |
| JP | 2011-212167 | | 10/2011 | |
| JP | 2011-223556 | | 11/2011 | |
| JP | 2011-223824 | | 11/2011 | |
| JP | 2011-233971 | | 11/2011 | |
| JP | 2011-234323 | | 11/2011 | |
| JP | 2012-028852 | | 2/2012 | |
| JP | 2012-034064 | | 2/2012 | |
| JP | 2012-508499 | | 4/2012 | |
| JP | 2012070245 | | 4/2012 | |
| JP | 2012-109663 | | 6/2012 | |
| JP | 2012-138770 | | 7/2012 | |
| JP | 2012-142679 | | 7/2012 | |
| JP | 2012-515574 | | 7/2012 | |
| JP | 2012-150266 | | 8/2012 | |
| JP | 2012-156781 | | 8/2012 | |
| JP | 2012-169817 | | 9/2012 | |
| JP | 2012-178695 | | 9/2012 | |
| JP | 5108161 | | 10/2012 | |
| JP | 2012-249097 | | 12/2012 | |
| JP | 2012-257072 | | 12/2012 | |
| JP | 2012244515 | | 12/2012 | |
| JP | 2013-005212 | | 1/2013 | |
| JP | 2013-055492 | | 3/2013 | |
| JP | 2013-061176 | | 4/2013 | |
| JP | 2013-078116 | | 4/2013 | |
| JP | 2013-514737 | | 4/2013 | |
| JP | 2013078116 | | 4/2013 | |
| JP | 2013-081047 | | 5/2013 | |
| JP | 2013-105272 | | 5/2013 | |
| JP | 2013-115638 | | 6/2013 | |
| JP | 2013-128896 | | 7/2013 | |
| JP | 2013-130402 | | 7/2013 | |
| JP | 2013-162167 | | 8/2013 | |
| JP | 2013-198072 | | 9/2013 | |
| JP | 2013-201560 | | 10/2013 | |
| JP | 2013-235316 | | 11/2013 | |
| JP | 2013235316 | A * | 11/2013 | ......... G08B 21/0415 |
| JP | 2013-255091 | | 12/2013 | |
| JP | 2013-255212 | | 12/2013 | |
| JP | 2013255091 | | 12/2013 | |
| JP | 2014-003488 | | 1/2014 | |
| JP | 2014003488 | | 1/2014 | |
| JP | 2014-089494 | | 5/2014 | |
| JP | 2014-116972 | | 6/2014 | |
| JP | 2014-190965 | | 10/2014 | |
| JP | 2014-229991 | | 12/2014 | |
| JP | 5676003 | | 2/2015 | |
| JP | 2015-061285 | | 3/2015 | |
| JP | 2015-082818 | | 4/2015 | |
| JP | 2015-084801 | | 5/2015 | |
| JP | 2015084801 | | 5/2015 | |
| JP | 2015-139132 | | 7/2015 | |
| KR | 970008927 | | 5/1997 | |
| KR | 10-1998-0022845 | | 6/1998 | |
| KR | 10-2005-0086378 | | 8/2005 | |
| KR | 20060121606 | | 11/2006 | |
| KR | 10-2007-0109323 | | 11/2007 | |
| KR | 10-2008-0006514 | | 1/2008 | |
| KR | 10-2008-0009602 | | 1/2008 | |
| KR | 10-2008-0040962 | | 5/2008 | |
| KR | 10-2009-0033564 | | 4/2009 | |
| KR | 10-2009-0120951 | | 11/2009 | |
| KR | 10-2010-0034906 | | 4/2010 | |
| KR | 10-2010-0041386 | | 4/2010 | |
| KR | 20110006838 | | 1/2011 | |
| KR | 20110121012 | | 11/2011 | |
| KR | 101358881 | | 2/2014 | |
| KR | 20150010087 | | 1/2015 | |
| TW | 200423682 | | 11/2004 | |
| TW | 200536415 | | 11/2005 | |
| TW | 200539664 | | 12/2005 | |
| TW | 200605621 | | 2/2006 | |
| TW | 1353164 | | 3/2009 | |
| TW | 1353164 | B | 3/2009 | |
| TW | I391880/200912814 | | 3/2009 | |
| TW | 201018982 | | 5/2010 | |
| TW | 201119339 | | 6/2011 | |
| TW | M452360 | U | 5/2013 | |
| TW | 201342313 | | 10/2013 | |
| TW | 201513629 | | 4/2015 | |
| WO | WO 1996/27253 | | 9/1996 | |
| WO | WO 1998/05148 | | 2/1998 | |
| WO | WO 2003/055183 | | 7/2003 | |
| WO | WO 2004/034734 | | 4/2004 | |
| WO | WO 2005/067339 | | 7/2005 | |
| WO | WO 2005/069586 | | 7/2005 | |
| WO | WO 2005/091670 | | 9/2005 | |
| WO | WO 2005/096599 | | 10/2005 | |
| WO | WO 2005/096664 | | 10/2005 | |
| WO | WO 2006/006313 | | 1/2006 | |
| WO | WO 2006/021133 | | 3/2006 | |
| WO | WO 2006/028045 | | 3/2006 | |
| WO | WO 2006/075440 | | 7/2006 | |
| WO | WO 2007/034739 | | 3/2007 | |
| WO | WO 2007/099707 | | 9/2007 | |
| WO | WO 2008/007666 | | 1/2008 | |
| WO | WO 2008/029515 | | 3/2008 | |
| WO | WO 2009/104437 | | 8/2009 | |
| WO | WO 2009/133873 | | 11/2009 | |
| WO | WO 2009/136498 | | 11/2009 | |
| WO | WO 2009/141912 | | 11/2009 | |
| WO | WO 2010/005045 | | 1/2010 | |
| WO | WO 2010/050154 | | 5/2010 | |
| WO | WO 2010/060323 | | 6/2010 | |
| WO | WO 2010/116510 | | 10/2010 | |
| WO | WO 2010/140087 | | 12/2010 | |
| WO | WO 2011/007679 | | 1/2011 | |
| WO | WO 2011/023672 | | 3/2011 | |
| WO | WO 2011/090944 | | 7/2011 | |
| WO | WO 2011/121740 | | 10/2011 | |
| WO | WO 2011/153165 | | 12/2011 | |
| WO | WO 2011/159349 | | 12/2011 | |
| WO | WO 2002/021881 | | 3/2012 | |
| WO | WO 2012/090947 | | 7/2012 | |
| WO | WO 2012097314 | | 7/2012 | |

(56) References Cited

FOREIGN PATENT DOCUMENTS

| | | |
|---|---|---|
| WO | WO 2012/114772 | 8/2012 |
| WO | WO 2012/114917 | 8/2012 |
| WO | WO 2013/047609 | 4/2013 |
| WO | WO 2013/121631 | 8/2013 |
| WO | WO 2013/168628 | 11/2013 |
| WO | WO 2014/156534 | 10/2014 |
| WO | WO 2015/122879 | 8/2015 |

OTHER PUBLICATIONS

Japanese Patent Office, International Search Report for International Patent Application PCT/JP2012/066376 (dated Oct. 30, 2012).
International Search Report for International Patent Application PCT/JP2011/080099 (dated Apr. 3, 2012).
Taiwanese Patent Office, search report in application 100148983 (2 pages) (dated Jan. 17, 2013).
U.S. Patent and Trademark Office, Office Action in U.S. Appl. No. 13/556,367 (dated Oct. 19, 2012).
European Patent Office, official communication in Application No. EP 11 85 3718 (dated May 14, 2014).
U.S. Patent and Trademark Office, Office Action in U.S. Appl. No. 13/489,971 (dated Oct. 24, 2012).
Isaka et al., "Development of Bone Conduction Speaker by Using Piezoelectric Vibration," The Japan Society of Mechanical Engineers (No. 04-5) Dynamics and Design Conference 2004 CD-ROM Compilation (Sep. 27-30, 2004; Tokyo) (and English translation).
Japanese Patent Office, International Search Report for International Patent Application PCT/JP2012/053231 (dated Mar. 13, 2012).
Extended European Search Report in European patent application No. 12866397.8 dated Jul. 20, 2015.
Japanese Patent Office, International Search Report for PCT/JP2014/071607 dated Nov. 11, 2014 (with English translation).
Japan Patent Office, International Search Report for PCT/JP2014/077792 dated Dec. 16, 2014 (with English translation) (0291US).
Extended European Search Report for PCTJP2013067781 dated Feb. 19, 2016.
Japanese Patent Office, official communication in Japanese Patent Application No. 2012-054308 dated Jun. 7, 2016 (and machine translation).
Japanese Patent Office, official communication in Japanese Patent Application No. 2015-056466 dated Jul. 12, 2016 (and machine translation).
Japanese Patent Office, official communication in Japanese Patent Application No. 2015-217427 dated Jul. 19, 2016 (and machine translation).
Japanese Patent Office, official communication in Japanese Patent Application No. 2015-217421 dated Jul. 19, 2016 (and machine translation).
SIPO of People's Republic of China, official communication for Chinese Patent Application No. 201180031904.5 dated Jul. 20, 2016 (and machine translation).
Japanese Patent Office, official communication in Japanese Patent Application No. 2012-120173 dated Jul. 26, 2016 (and machine translation).
Japanese Patent Office, official communication in Japanese Patent Application No. 2015-048052 dated Aug. 2, 2016 (and machine translation).
Japanese Patent Office, official communication in Japanese Patent Application No. 2012-147753 dated Aug. 23, 2016 (and machine translation).
Japanese Patent Office, official communication in Japanese Patent Application No. 2015-231478 dated Aug. 30, 2016 (and machine translation).
News Release, "New Offer of Smartphone Using Cartilage Conduction", Rohm Semiconductor, Kyoto, Japan, Apr. 23, 2012 (with English translation).
European Patent Office, Partial Search Report for EP 11 85 3443 dated Oct. 27, 2016.
Japan Patent Office, International Search Report for PCT/JP2015/071490 dated Nov. 2, 2015 with English translation.
U.S. Patent and Trademark Office, Office Action in U.S. Appl. No. 15/049,403 dated Nov. 23, 2016.
U.S. Patent and Trademark Office, Office Action in U.S. Appl. No. 15/174,746 dated Nov. 25, 2016.
Smartphone Black Berry Bold 9700, Operation guide (2010).
Office Action for JP Patent Application No. 2016-013411 dated Nov. 22, 2016 with English Translation.
Office Action for KR Patent Application No. 10-2016-7004740 dated Nov. 28, 2016 with English Translation.
Office Action for JP Patent Application No. 2012-252203 dated Dec. 20, 2016 with English Translation.
Office Action for JP Patent Application No. 2012-243480 dated Dec. 20, 2016 with English Translation.
Office Action for JP Patent Application No. 2012-229176 dated Dec. 27, 2016 with English Translation.
Office Action for JP Patent Application No. 2012-268649 dated Jan. 31, 2017 with English Translation.
Office Action for JP Patent Application No. 2012-054308 dated Feb. 7, 2017 with English Translation.
Final Office Action for JP Patent Application No. 2012-120173 dated Feb. 7, 2017 with English translation.
Japanese Office Action in Japanese Application No. 2016-051347, dated Feb. 14, 2017, 6 pages (English Translation).
Korean Office Action in Korean Application No. 10-2015-7005518, dated Mar. 20, 2017, 12 pages (English Translation).
Japanese Office Action in Japanese Application No. 2015-217421, dated Feb. 28, 2017, 6 pages (English Translation).
Japanese Office Action in Japanese Application No. 2013-028997, dated Mar. 21, 2017, 8 pages (English Translation).
International Search Report for International Application No. PCT/JP2017/000787, dated Mar. 28, 2017, 1 page.
Japanese Office Action in Japanese Application No. 2016-087027, dated Mar. 28, 2017, 9 pages (English Translation).
Japanese Office Action in Japanese Application No. 2016-097777, dated Mar. 21, 2017, 8 pages (English Translation).
Chinese Office Action in Chinese Application No. 201510148247.2, dated May 3, 2017, 39 pages (English Translation).
Japanese Office Action in Japanese Application No. 2016-114221, dated Jun. 13, 2017, English Translation.
Japanese Office Action in Japanese Application No. 2012-150941, dated May 9, 2017, English Translation.
Shimomura et al., "Vibration and Acoustic Characteristics of Cartilage Transducer," Acoustical Society of Japan, 2010 with Partial English Translation.
Rion Co. Ltd., "New-generation Vibration Level Meter Model VM-51," Acoustical Society of Japan, 1990 with Partial English Translation.
Japanese Office Action in Japanese Application No. 2013-106416, dated May 30, 2017, English Translation.
Japanese Office Action in Japanese Application No. 2012-197484, dated Jun. 13, 2017, English Translation.
Japanese Office Action in Japanese Application No. 2013-126623, dated Jun. 13, 2017, English Translation.
Office Action for Japanese Patent Application No. 2016-185559 dated Jul. 25, 2017 with English translation.
Office Action for Japanese Patent Application No. 2016-195560 dated Aug. 22, 2017 with English translation.
Office Action for Japanese Patent Application No. 2016-197219 dated Aug. 22, 2017_ with English translation.
Office Action for Japanese Patent Application No. 2016-197225 dated Aug. 22, 2017 with English translation.
Office Action for Japanese Patent Application No. 2013-186424 dated Sep. 26, 2017_with English translation.
Office Action for Japanese Patent Application No. 2013-195756 dated Sep. 26, 2017_with English translation.
Office Action for Japanese Patent Application No. 2013-173595 dated Oct. 10, 2017 (with English translation).
Fukumoto, M. and Sugimura, T., Fulltime-wear Interface Technology, NTT Technical Review, 8(1):77-81, (2003) (with English Translation).

(56) References Cited

OTHER PUBLICATIONS

Sasaki C, Crusoe Supplementary Class note Which Condensed the Function Called for, ASCII, 12 pages (2001) (Partial English Translation).
Office Action mailed for KR Patent Application No. 10-2017-7019074 dated Oct. 13, 2017 with English Translation.
Office Action mailed for Japanese Patent Application No. 2013-227279 dated Oct. 17, 2017 with English translation.
Office Action for Japanese Patent Application No. 2013-221303 dated Oct. 17, 2017 with English Translation.
Office Action for Japanese Patent Application No. 2013-237963 dated Nov. 7, 2017 with English Translation.
Office Action for Japanese Application No. 2017-004233 dated Nov. 21, 2017 with English Translation.
Office Action for Japanese Patent Application No. 2016-236604 dated Nov. 21, 2017 with English Translation.
Office Action for Japanese Patent Application No. 2014-010271 dated Nov. 28, 2017 with English Translation.
Office Action for Japanese Patent Application No. 2017-000580 dated Dec. 19, 2017 with English Translation.
Office Action for Korean Application No. 10-2016-7004740 dated Dec. 19, 2017 with English Translation.
Office Action for Japanese Patent Application No. 2013-221303 dated Dec. 26, 2017 with English Translation.
Office Action for Japanese Patent Application No. 2013-237963 dated Dec. 26, 2017 with English Translation.
International Search Report for International Application No. PCT/JP2016/070848, dated Sep. 9, 2016, 5 pages.
Japan Patent Office, International Search Report for PCT/JP2016/076494 dated Nov. 29, 2016, with English translation.
European Patent Office, EESR for European Patent Application No. 15834516 dated Mar. 12, 2018.
SIPO Patent Office, Chinese Patent Application No. 2014800584218 dated Jan. 3, 2018, with English translation.
Japan Patent Office, Office Action for Japanese Patent Application No. 2013-106416 dated Jan. 9, 2018 with English translation.
Japan Patent Office, Office Action for Japanese Patent Application No. 2016-202733 dated Mar. 13, 2018 with English translation.
Japan Patent Office, International Search Report for PCT/JP2017/000787, dated Mar. 28, 2017 (with English translation).
SIPO, Office Action dated Aug. 8, 2018 for Chinese application No. 201580044713.0 (with English translation).
Japan Patent Office, Office Action dated Oct. 23, 2018 for Japanese application No. 2015-012282 (with English translation).
European Extended Search Report for EP Application No. 18179998.2_dated Oct. 26, 2018.
Korean Intellectual Property Office, Office Action for counterpart KR Application No. 10-2017-7016517 dated Oct. 31, 2018 with English translation.
Japan Patent Office, Office Action for JP Application No. 2014-256091 dated Oct. 30, 2018 with English translation.
European Patent Office, EESR for EP Application No. 16824527.2 mailed on Feb. 28, 2019.
European Patent Office. EESR for EP Application No. 16846372.7 mailed on Feb. 19, 2019.
Korean Intellectual Property Office, Office Action for Korean Application No. 10-2018-7014722 dated Dec. 26, 2018 (with English Translation).
Korean Intellectual Property Office, Office Action for Korean Application No. 10-2018-7006763 dated Jan. 30, 2019 (with English Translation).
Korean Intellectual Property Office, Office Action for Korean Application No. 10-2018-7034989 dated Mar. 4, 2019 (with English Translation).
SIPO, Office Action for Chinese Application No. 201610520280.8 dated Jan. 3, 2019 with English Translation.

* cited by examiner

WATCHING SYSTEM, WATCHING DETECTION DEVICE, AND WATCHING NOTIFICATION DEVICE

CROSS-REFERENCE TO RELATED APPLICATION(S)

This application is a continuation of U.S. application Ser. No. 15/500,575, now U.S. Pat. No. 10,013,862.

TECHNICAL FIELD

The present invention relates to a watching system, a watching detection device, and a watching notification device.

BACKGROUND ART

As for a watching system, Patent Literature 1 listed below proposes receiving data of detection both from a human detection sensor installed in a home of a person as a target to be watched and from an acceleration sensor that the resident wears, to make judgments on activities and conditions of the resident and events occurring in the home. On the other hand, Patent Literature 2 listed below proposes a mastication movement detection device in which the number of mastication movements is counted based on a detected waveform received from a detector that is placed in an external auditory canal and detects an amount of deformation of the external auditory canal. Also, as for cartilage conduction, which has been discovered as a third conduction route in addition to the long-known air conduction and bone conduction, Patent Literature listed below describes that vibration generated by a vibration source contacting an ear cartilage around the entrance part of an external auditory canal causes air-conducted sound to be generated from a cartilage surface inside the external auditory canal, and the generated air-conducted sound then proceeds through the inside of the external auditory canal to reach an tympanic membrane.

CITATION LIST

Patent Literature

Patent Literature 1: Japanese Patent Application Publication No. 2014-89494

Patent Literature 2: Japanese Patent Application Publication No. 2011-10791

Patent Literature 3: Japanese Patent Application Publication No. 2013-81047

SUMMARY OF INVENTION

Technical Problem

However, there are many problems that require further consideration regarding watching systems, watching detection devices, and watching notification devices.

In view of the above background, an object of the present invention is to provide an effective watching system, watching detection device, and watching notification device.

Solution to Problem

A watching detection device disclosed herein includes a cartilage conduction vibration source and a watching detection sensor, and is mountable to an ear without closing an entrance of an external auditory canal (a first configuration).

Here, the watching detection device having the first configuration may further include an air conduction microphone, and function as a hearing aid by vibrating the cartilage conduction vibration source in accordance with a voice signal picked up by the air conduction microphone (a second configuration).

The watching detection device having the first configuration may further include a short-range communication unit capable of communicating with a watching notification device, and makes the cartilage conduction vibration source vibrate in accordance with a voice signal received from the watching notification device via the short-range communication unit (a third configuration).

In the watching detection device having the first configuration, the watching detection sensor may be a masticatory movement sensor (a fourth configuration). In the watching detection device having the fourth configuration, the masticatory movement sensor may serve also as the cartilage conduction vibration source (a fifth configuration).

In the watching detection device having the first configuration, the watching detection sensor may be a voice sensor (a sixth configuration). In the watching detection device having the sixth configuration, the voice sensor may be a bone conduction microphone (a seventh configuration). In the watching detection device having the seventh configuration, the bone conduction microphone may serve also as the cartilage conduction vibration source (an eighth configuration). The watching detection device having the seventh configuration may further include an air conduction microphone for a hearing-aid function, and the air conduction microphone may be turned off when the bone conduction microphone is used (a ninth configuration).

A watching system disclosed herein includes the watching detection device having the first configuration and a watching notification device that receives watching information from the watching detection sensor via short-range communication with the watching detection device (a tenth configuration).

In the watching system having the tenth configuration, the watching detection sensor may be a voice sensor, the watching notification device may issue a notification of whether a voice signal picked up by the voice sensor is present, without issuing any notification of contents of the voice signal (an eleventh configuration). In the watching system having the eleventh configuration, the watching notification device may make a judgment on urgency of the voice signal picked up by the voice sensor and issue a notification of the contents of the voice signal exceptionally when the urgency is high (a twelfth configuration).

In the watching system having the tenth configuration, the watching notification device may issue a notification when it has been impossible to receive a detection signal from the watching detection sensor for a predetermined period of time (a thirteenth configuration). In the watching system having the tenth configuration, the watching notification device may include a plurality of watching notification devices that each receive watching information from a same watching detection device, and the plurality of watching notification devices exchange with each other the watching information received (a fourteenth configuration). In the watching system having the tenth configuration, the watching notification device may be a mobile phone, and a voice signal of a call partner received by the mobile phone may be transmitted to the watching detection device via short-range communication to vibrate the cartilage conduction vibration source (a fifteenth configuration).

A watching system disclosed herein includes a watching detection device and a plurality of watching notification devices that each receive watching information from the watching detection device via short-range communication with the watching detection device, and the plurality of watching notification devices exchange with each other the watching information received (a sixteenth configuration).

In the watching system having the sixteenth configuration, the plurality of watching notification devices issue different notifications based on the watching information (a seventeenth configuration). In the watching system having the sixteenth configuration, the plurality of watching notification devices include a mobile phone and a notification device placed in a home (an eighteenth configuration).

A watching notification device disclosed herein includes an acquisition unit which acquires watching information from a voice sensor and a notification unit which issues a notification of whether a voice signal acquired by the acquisition unit is present, without issuing any notification of contents of the voice signal (a nineteenth configuration).

In the watching detection device having the nineteenth configuration, the notification unit may make a judgment on urgency of the voice signal acquired by the acquisition unit and issue a notification of the contents of the voice signal exceptionally when the urgency is high (a twentieth configuration).

Advantageous Effects of Invention

As described above, according to the present invention, an effective watching system, watching detection device, and watching notification device are provided.

DESCRIPTION OF EMBODIMENTS

First Embodiment

Figure 1:
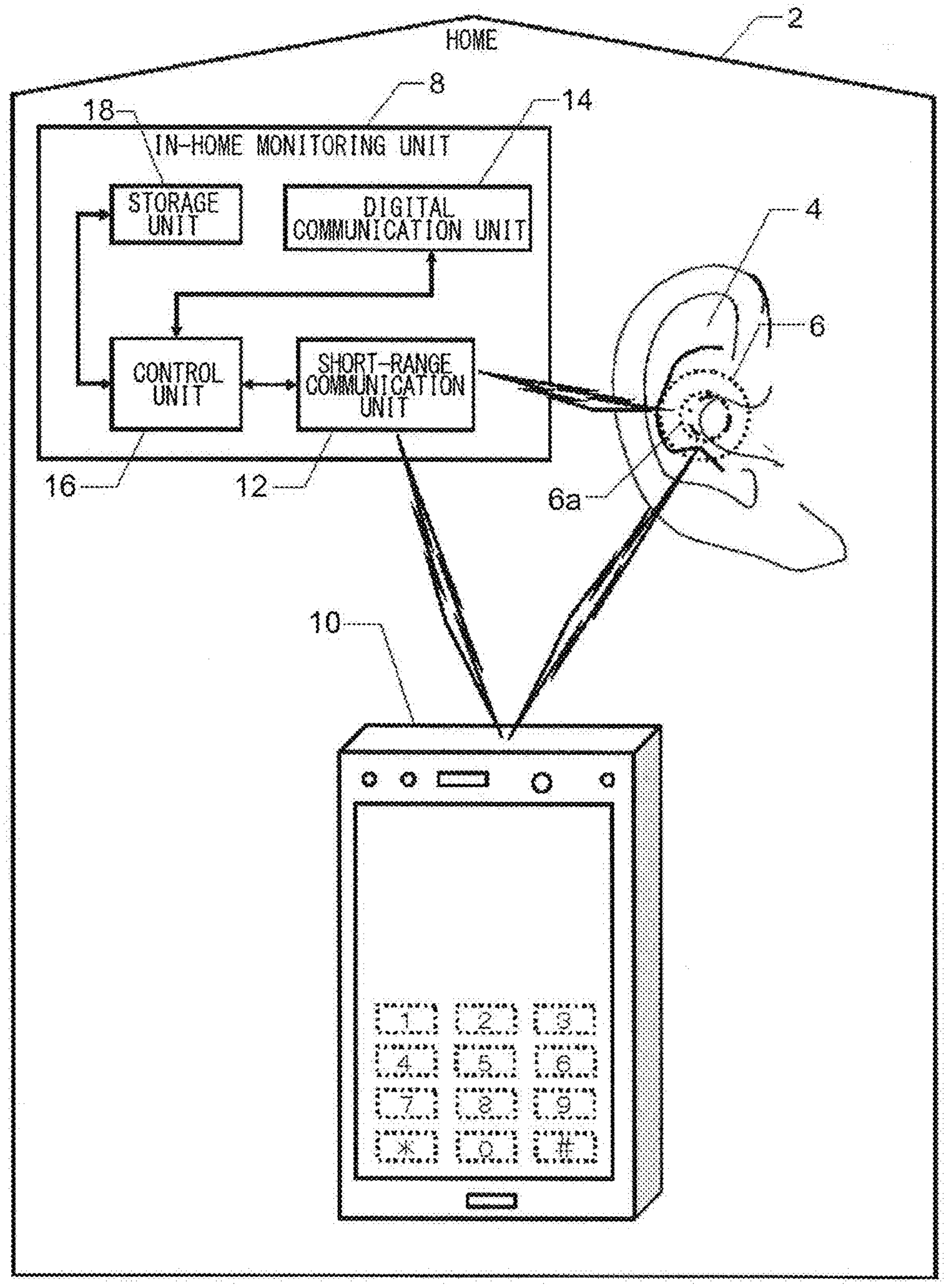
FIG. 1 is a diagram illustrating a system configuration of a first embodiment of the present invention (first embodiment)

FIG. 1 is a diagram illustrating a system configuration of a first embodiment according to an aspect of the present invention. According to the first embodiment, a watching system that performs watching inside a home 2 includes an ear-mounted unit 6 (indicated by a short-dashed line for distinction from a structure of an ear), which contacts a cartilage around a hole of an ear 4 of a watching-target person by being sandwiched between an antihelix and a tragus to fit in a cavum conchae, an in-home monitoring unit 8, and a mobile phone 10 of the watching-target person. The in-home monitoring unit 8 and the mobile phone 10 exchange information with the ear-mounted unit 6 via short-range communication. The mobile phone 10 exchanges information with the ear-mounted unit 6 and the in-house monitor unit 8 via short-range communication.

The ear-mounted unit 6 functions as a headset for the mobile phone 10 by performing the short-range communication with the mobile phone 10, and allows a phone call to be made with the mobile phone 10 kept in a clothes pocket. The ear-mounted unit 6 also independently functions as a hearing aid. These functions as a headset and as a hearing aid are both achieved by making use of cartilage conduction, which will be described later. The ear-mounted unit 6 further includes a mastication sensor to detect movement of the tragus, etc., or deformation of the external auditory canal, caused by masticatory movement. Here, the ear-mounted unit 6 is ring-shaped with a hole 6*a*, so that the entrance of the external auditory canal is open even when the ear-mounted unit 6 is fitted in the external auditory canal. This makes it possible to hear external sound via the hole 6*a*, and contributes to a comfortable wear of the ear-mounted unit 6 without a feeling of blockage in the external auditory canal. Further, by closing the hole 6*a* with a finger or covering it with a palm as necessary as will be described later, it is possible to obtain an occlusion effect in the cartilage conduction to hear a larger sound.

The in-home monitor unit 8 has a short-range communication unit 12 for short-range communication with the ear-mounted unit 6 and the mobile phone 10, and a digital communication unit 14 which performs always-on-connection Internet communication with an external device. A control unit 16 controls the entire in-home monitoring unit 8, which includes the short-range communication unit 12 and the digital communication unit 14. A storage unit 18 stores therein a program necessary for the control performed by the control unit 16, and also temporarily stores therein various pieces of data related to the control, etc.

With this configuration, the in-home monitoring unit 8 receives a result of detection of masticatory movement from the ear-mounted unit 6 via the short-range communication. If no masticatory movement expected in daily life has been detected, the in-home monitor unit 8 judges that there is a possibility of an abnormality, and notifies a watching-service provider to that effect via the digital communication unit 14. Further, the in-home monitoring unit 8 receives information regarding presence/absence of voice of the watching-target person detected by the headset function of the ear-mounted unit 6. In a case where there is no voice detected within a predetermined period of time, or in a case where a voice signal conveying urgency, such as a scream, has been detected, the in-home monitoring unit 8 judges that there is a possibility of an abnormality, and notifies a watching-service provider to that effect via the digital communication unit 14.

Further, the mobile phone 10 receives a result of detection of masticatory movement from the ear-mounted unit 6 via short-range communication. If no masticatory movement expected in daily life has been detected, the mobile phone 10 judges that there is a possibility of an abnormality, and makes an automatic phone call to a mobile phone of a member of family of the watching-target person or the like who lives remotely and has been registered in advance, and when an answer to the phone call is received, the mobile phone 10 notifies him/her to that effect in a form of an automatic voice message. Further, the mobile phone 10 receives information regarding presence/absence of voice of the watching-target person detected by the headset function of the ear-mounted unit 6. In a case where there is no voice detected within a predetermined period of time, or in a case where a signal of voice conveying urgency, such as a scream, has been detected, the mobile phone 10 judges that there is a possibility of an abnormality, and makes an automatic phone call to the mobile phone of the member of family of the watching-target person or the like who lives remotely and has been registered in advance, and when an answer to the phone call is received, the mobile phone 10 issues a notification to that effect.

Here, in a case where masticatory movement expected in daily life is detected, too, the mobile phone 10 makes an automatic phone call to the mobile phone of the member of family of the watching-target person or the like who lives remotely, and when an answer to the phone call is received, the mobile phone 10 notifies him/her to the effect that there is no abnormality occurring as an automatic voice message. Further, based on detection of a normal voice of the watching-target person, too, the mobile phone 10 makes an automatic phone call to the member of family of the watching-target person or the like who lives remotely as necessary, and when an answer to the phone call is received, the mobile phone 10 notifies him/her to the effect that there is no abnormality occurring in the form of an automatic voice message. This makes it possible for the member of family of the watching-target person or the like who lives remotely to know that the watching-target person regularly has three meals a day, and presence of conversation that the watching-target person is expected to usually have or a state of voice to be regularly uttered in a previously set time zone (for example, conversation in daily shopping, daily sutra chanting), and to rest reassured knowing that the watching-target person is all right. In this case, however, the mobile phone 10 makes an automatic phone call even when the watching-target person does not intend to, and thus contents of such conversations are to be undesirably heard by the member of family of the watching-target person or the like who lives remotely. Even though it is his or her own family member that hears the contents of such conversations, this is not desirable to the watching-target person in terms of privacy, and thus, as will be described later, what is notified is just whether or not voice has been uttered so that the contents of a conversation cannot be heard.

Figure 2:
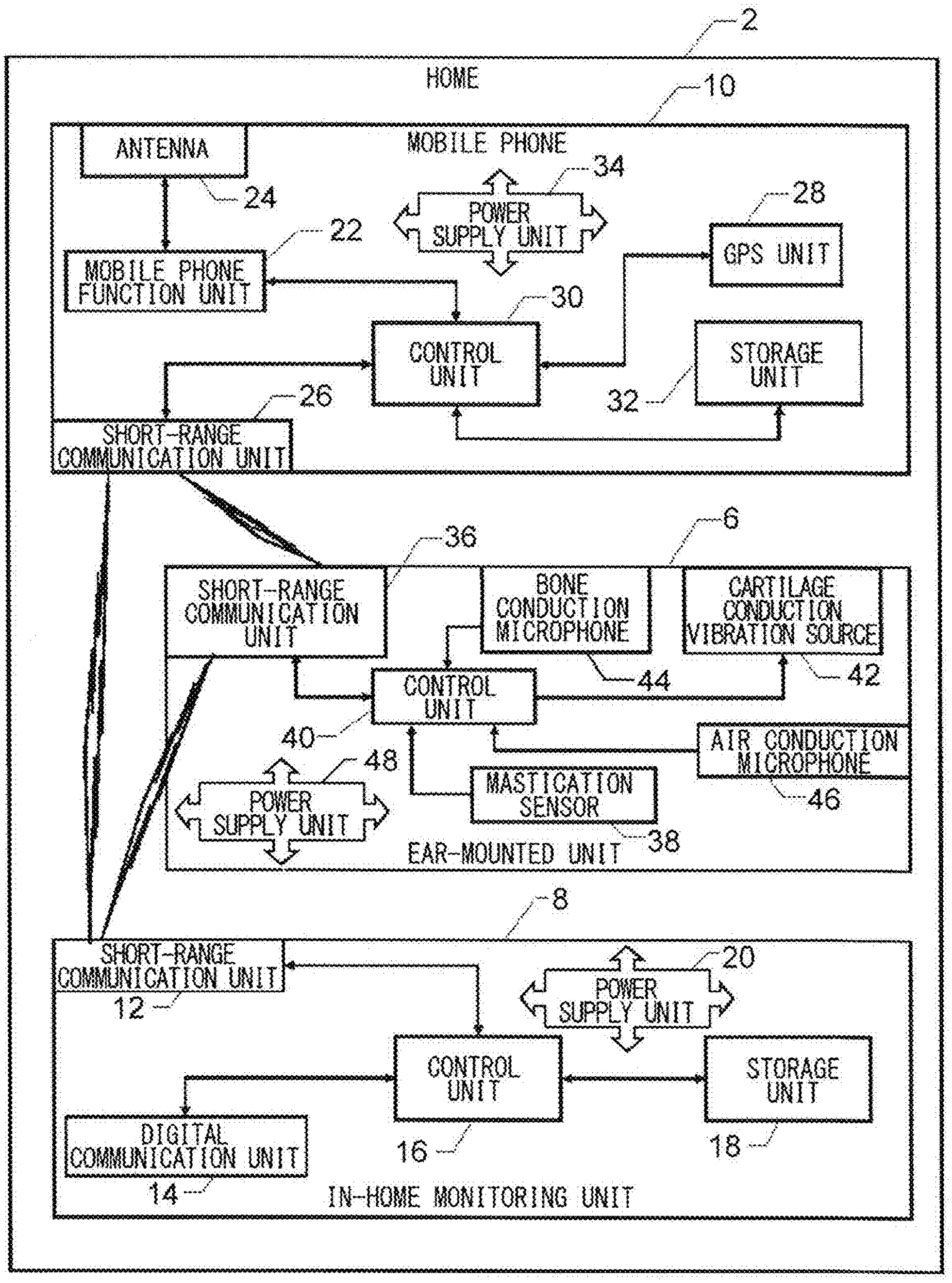
FIG. 2 is a block diagram illustrating a detailed configuration of the first embodiment described in FIG. 1.

FIG. 2 is a block diagram illustrating a detailed configuration of the first embodiment of the present invention illustrated in FIG. 1. Such elements in FIG. 2 having counterparts in FIG. 1 are given the same reference numbers as their counterparts, and descriptions thereof will be omitted unless necessary. The in-home monitoring unit 8, which is configured as illustrated in FIG. 1, includes a power supply unit 20 which supplies power to the entire in-home monitoring unit 8. The power supply unit 20 receives power from a household power supply in the home 2.

On the other hand, as illustrated in FIG. 2, the mobile phone 10 includes a mobile phone function unit 22 to perform phone communication by means of an antenna 24 via a wireless telephone network. A short-range communication unit 26 communicates with the short-range communication units 36 and 12 of the ear-mounted unit 6 and the in-home monitoring unit 8, respectively. A GPS unit 28 detects a location of the watching-target person wearing the ear-mounted unit 6 when he/she is out, and communicates with the mobile phone of the member of family of the watching-target person or the like who lives remotely or with the watching-service provider, who have been described above, to thereby provide them with information of the location of the watching-target person. A control unit 30 performs entire control of the entire mobile phone 10, which includes the mobile phone function unit 22, the short-range communication unit 26, and the GPS unit 28. A storage unit 32 stores therein a program necessary for the control performed by the control unit 30, and also, temporarily stores therein various pieces of data related to the control, etc. A power supply unit 34 includes a rechargeable storage battery, and supplies power to the entire mobile phone 10. In FIG. 2, for simplicity, such ones of the components of the mobile phone 10 as are typically included in mobile phones, such as a large-sized touch-panel liquid crystal display unit, a microphone, a speaker, a proximity sensor, and an inner camera, are not illustrated.

As illustrated in FIG. 2, the ear-mounted unit 6 includes the short-range communication unit 36, which performs short-range communication with the short-range communication unit 26 of the mobile phone 10 and the short-range communication unit 12 of the in-home monitoring unit 8. A mastication sensor 38 detects movement of the tragus, etc., or deformation of the external auditory canal of the watching-target person, caused by masticatory movement of the watching-target person, and thereby detects presence/absence of mastication of the watching-target person. The mastication sensor 38 includes, for example, a strain gage, a piezoelectric element, or the like. When a masticatory movement is detected, a control unit 40 notifies the mobile phone 10 to that effect through the short-range communication unit 36 and the short-range communication unit 26. If no masticatory movement expected in daily life is detected, the control unit 40 judges that there is a possibility of an abnormality, and, by means of the short-range communication unit 36, notifies the mobile phone 10 and the in-home monitoring unit 8 to that effect through the short-range communication unit 26 and the short-range communication unit 36, respectively.

The ear-mounted unit 6 includes a cartilage conduction vibration source 42 (which is, for example, a piezoelectric bimorph element), which vibrates in accordance with a voice signal of a call partner received from the mobile phone 10 via short-range communication, and this vibration is transmitted to an ear cartilage in contact with the ear-mounted unit 6, and this makes it possible to hear the voice of the phone call partner by cartilage conduction, which will be described later. A bone conduction microphone 44 catches bone-conducted own voice of the watching-target person and transmits a voice signal of the own voice to the mobile phone 10 via short-range communication, and this enables conversations to be conducted. In this manner, the ear-mounted unit 6 functions as a headset for the mobile phone 10. An air conduction sound microphone 46 catches an air-conducted voice of an outside conversation partner located close to the watching-target person to obtain a voice signal of the conversation partner, which makes the cartilage conduction vibration source 42 vibrate. In this manner, the ear-mounted unit 6 also independently functions as a hearing aid. The control unit 40 controls the ear-mounted unit 6 also with respect to the head-set and hearing-aid functions. In the headset function, as described above, the bone conduction microphone 44 also functions as a voice sensor for watching whether or not the watching-target person utters voice expected in daily life. A power supply unit 48, which includes a rechargeable storage battery, supplies power to the entire ear-mounted unit 6.

Now, cartilage conduction will be explained. Cartilage conduction is a phenomenon discovered by the present inventors, and denotes the phenomenon in which vibration conducted to the cartilage around an entrance part of the external auditory canal, such as that in the tragus, makes the surface of an external-auditory-canal cartilaginous part vibrate, producing air-conducted sound inside the external auditory canal. The air-conducted sound produced inside the external auditory canal travels on deeper into the external auditory canal and reaches the tympanic membrane. Thus, the greater part of the sound heard by cartilage conduction is the sound heard via the tympanic membrane. Here, however, the sound heard via the tympanic membrane is not ordinary air-conducted sound, i.e., sound that has entered the external auditory canal from outside, but air-conducted sound that is produced inside the external auditory canal.

Figure 3:
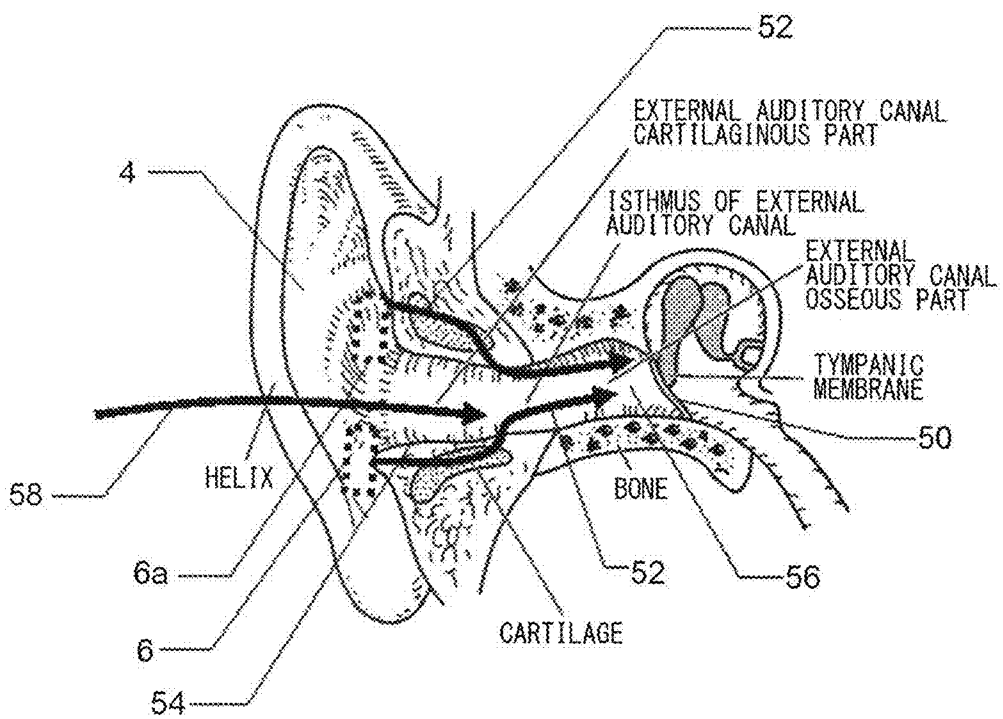
FIG. 3 is a sectional view of an ear for describing cartilage conduction.

FIG. 3 is a sectional view of an ear for illustrating the phenomenon of cartilage conduction mentioned just above, and illustrates a relationship between the structure of an ear 4 and the ear-mounted unit 6 used in the present invention. Arrows 52 indicate transmission routes of vibration of the ear-mounted unit 6 which is made to vibrate by the cartilage conduction vibration source 42. Vibration generated from the ear-mounted unit 6 is, as indicated by the arrows 52, first conducted from a contact part to a cartilage 54 around the entrance part of the external auditory canal. The vibration of the cartilage 54 generates, from its surface (the external-auditory-canal cartilaginous part), air-conducted sound inside the external auditory canal. Then the air-conducted sound travels on deeper into the external auditory canal and reaches a tympanic membrane 50 via an external auditory canal osseous part 56. Here, as indicated by an arrow 58 (which indicates a route of ordinary audible sound), air-conducted sound from outside enters the external auditory canal via the hole 6*a* of the ear-mounted unit 6, and reaches the tympanic membrane 50. This contributes to comfortable wear of the ear-mounted unit 6 without a feeling of blockage in the external auditory canal.

Figure 4:
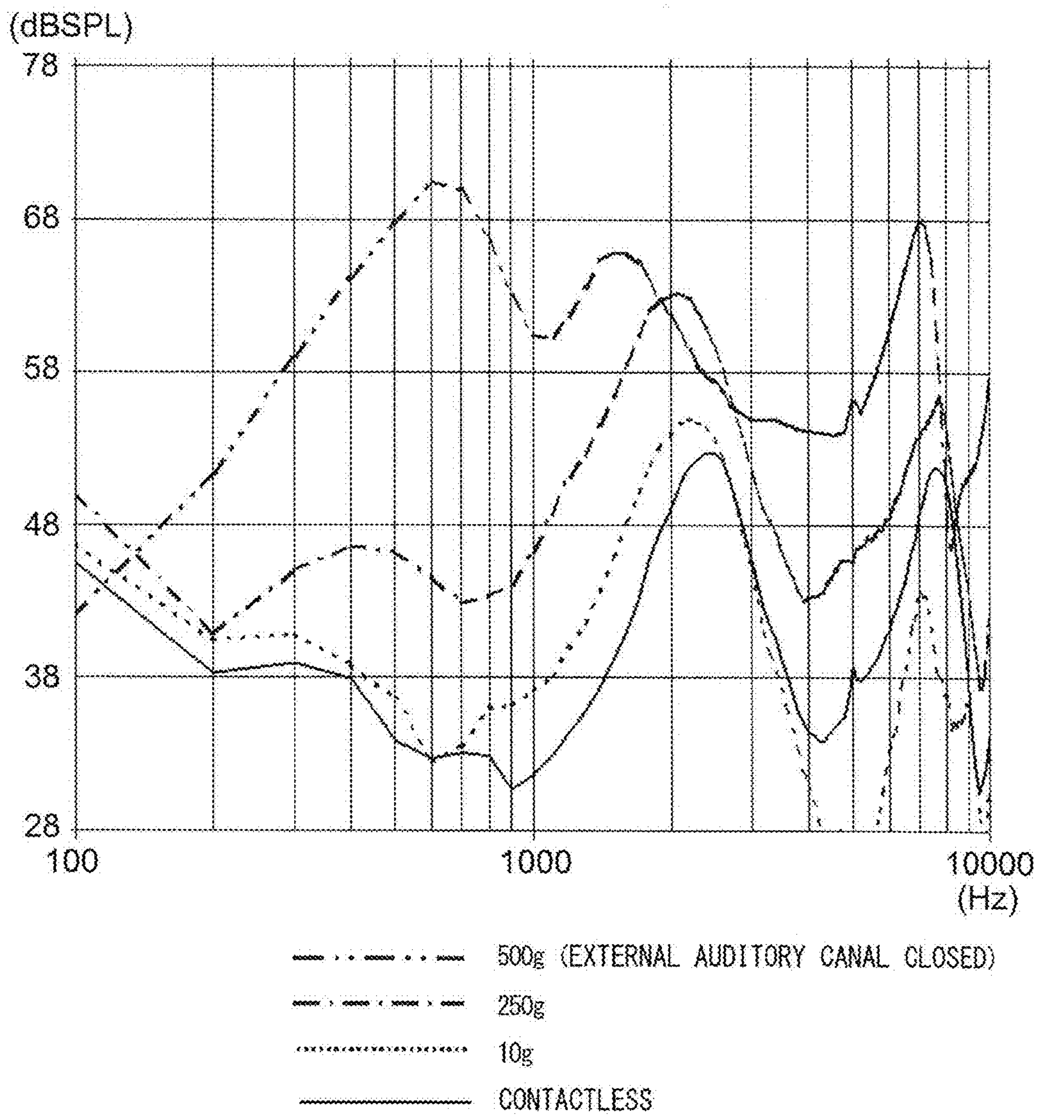
FIG. 4 is a graph illustrating an example of measured data which shows an effect of the cartilage conduction.

FIG. 4 is a graph illustrating an example of measured data showing an effect of cartilage conduction. The graph of FIG. 4 illustrates, in relation to frequency, sound pressure within the external auditory canal at a position 1 cm inside from the entrance part of the external auditory canal when, without contact with a helix, a surface of an outer wall of a vibration body that is caused to vibrate by a cartilage conduction vibration source is brought into contact with at least part of ear cartilage around the entrance part of the external auditory canal. In the graph, a vertical axis indicates sound pressure (in dBSPL), and a horizontal axis indicates frequency on a logarithmic scale (in Hz). In terms of contact pressure relationship between the surface of the outer wall of the vibration body and the cartilage around the entrance part of the external auditory canal, the graph uses a solid line to illustrate the sound pressure during a non-contact state (in a state where only air-conducted sound generated from the surface of the outer wall of the vibration body can be heard), a short dashed line to illustrate the sound pressure under a contact pressure of 10 grams, a single-dotted chain line to illustrate the sound pressure under a contact pressure of 250 grams, and a double-dotted chain line to illustrate the sound pressure under a contact pressure of 500 grams. As illustrated in the figure, the sound pressure increases as the contact pressure is increased from the non-contact state to the 10-gram contact pressure, and further increases as the contact pressure is increased to 250 grams, and then, the sound pressure increases even more as the contact pressure is further increased to 500 grams.

As can be readily understood from the graph of FIG. 4, when the surface of the outer wall of the vibration body is brought into contact with at least part of the ear cartilage around the entrance part of the external auditory canal without contacting the helix, the sound pressure at the position 1 cm inside from the entrance part of the external auditory canal increases by at least 10 dB in a main frequency range of voice (500 Hz to 2,300 Hz), compared to in the non-contact state. (See and compare the non-contact state indicated by the solid line with the state indicated by the single-dotted chain line.)

As can also be readily understood from the graph of FIG. 4, when the surface of the outer wall of the vibration body is brought into contact with at least part of the ear cartilage around the entrance part of the external auditory canal without contacting the helix, the sound pressure at the position 1 cm inside from the entrance part of the external auditory canal changes by at least 5 dB in the main frequency range of voice (500 Hz to 2,500 Hz) as the contact pressure changes. (See and compare the slightly contacting state indicated by the short-dashed line with the state indicated by the single-dotted chain line).

As is clear from the above description, even when the ear-mounted unit 6 does not have a structure for generating air-conducted sound (such as a vibration plate included in typical earphones), it is possible to obtain sufficient sound pressure by transmitting vibration of the cartilage conduction vibration source 42 to the ear cartilage by bringing the cartilage conduction vibration source 42 into contact with the ear cartilage. As is also clear from the above description, since there is no need of providing a structure for generating air-conducted sound, the ear-mounted unit 6 can be formed in a ring shape having the hole 6*a*, for example, and this makes it possible to hear outside sound through the hole 6*a* even when the ear-mounted unit 6 is mounted to an ear, and this contributes to comfortable wear of the ear-mounted unit 6 without a feeling of blockage in the external auditory canal.

Further, as can be readily understood from the graph of FIG. 4, when the entrance part of the external auditory canal is closed by bringing the surface of the outer wall of the vibration body into firm contact with at least part of the ear cartilage (the data of FIG. 4 was actually obtained by measurement performed in a state where the entrance of the external auditory canal was closed with the tragus bent with the surface of the outer wall of the vibration body pressed against the tragus from outside), the sound pressure at the position 1 cm inside from the entrance portion of the external auditory canal increases by at least 20 dB in the main frequency range of voice (300 Hz to 1800 Hz). This is caused by the occlusion effect. (See and compare the non-contact state indicated by the solid line with the state where the external auditory canal is closed indicated by the double-dotted chain line).

The measurement results of which are illustrated in FIG. 4 was all conducted under a constant output of the cartilage conduction vibration source. Regarding FIG. 4, for the measurement conducted with the surface of the outer wall of the vibration body contacting at least part of the ear cartilage around the entrance part of the external auditory canal without contacting the helix, the surface of the outer wall of the vibration body was brought into contact with at least part of the ear cartilage from outside of the tragus. Also, for the measurement conducted with the external auditory canal closed, the closed state of the external auditory canal was brought about by pressing the tragus from outside so strong as to bend the tragus as described above.

In the first embodiment, the occlusion effect as described above can be achieved by closing the hole 6*a* and increasing the contact pressure of the ear-mounted unit 6 against the cartilage by pushing the ear-mounted unit 6 with a finger placed over the hole 6*a*. Or, instead, the occlusion effect can be achieved by covering the entire ear 4 with a palm. Thus, clearly, in the first embodiment, too, it is possible to hear a larger sound by closing the hole 6*a* with a finger or entirely covering the ear with a palm.

The measurement graph of FIG. 4 is merely an example; upon further scrutiny, there are individual differences. Also, for simplification and standardization of the phenomenon, the values illustrated in the measurement graph of FIG. 4 were obtained through measurement performed in a state where the surface of the outer wall of the vibration body was in contact only with a small surface area of the outside of the tragus. However, increase in sound pressure caused by the contact with the cartilage also depends on the area of the contact, and in a case where the surface of the outer wall is in contact with the ear cartilage around the entrance part of the external auditory canal without contacting the helix, the increase in sound pressure is further elevated when the surface of the outer wall of the vibration body is in contact with a portion of the cartilage wider than around the entrance part of the external auditory canal. In consideration of the above facts, the values illustrated in the measurement graph of FIG. 4 have generality in illustrating the configuration making use of cartilage conduction, and can be reproduced by many and unspecified subjects. Further, the measurement graph of FIG. 4 was drawn by plotting the values obtained by the measurement conducted with the tragus being pressed from the outside in closing the entrance part of the external auditory canal to thereby increase the contact pressure and fold the tragus over, but similar results can be obtained also in a case where the outer wall of the vibration body is pressed into the entrance part of the external auditory canal to close the external auditory canal.

Figure 5:
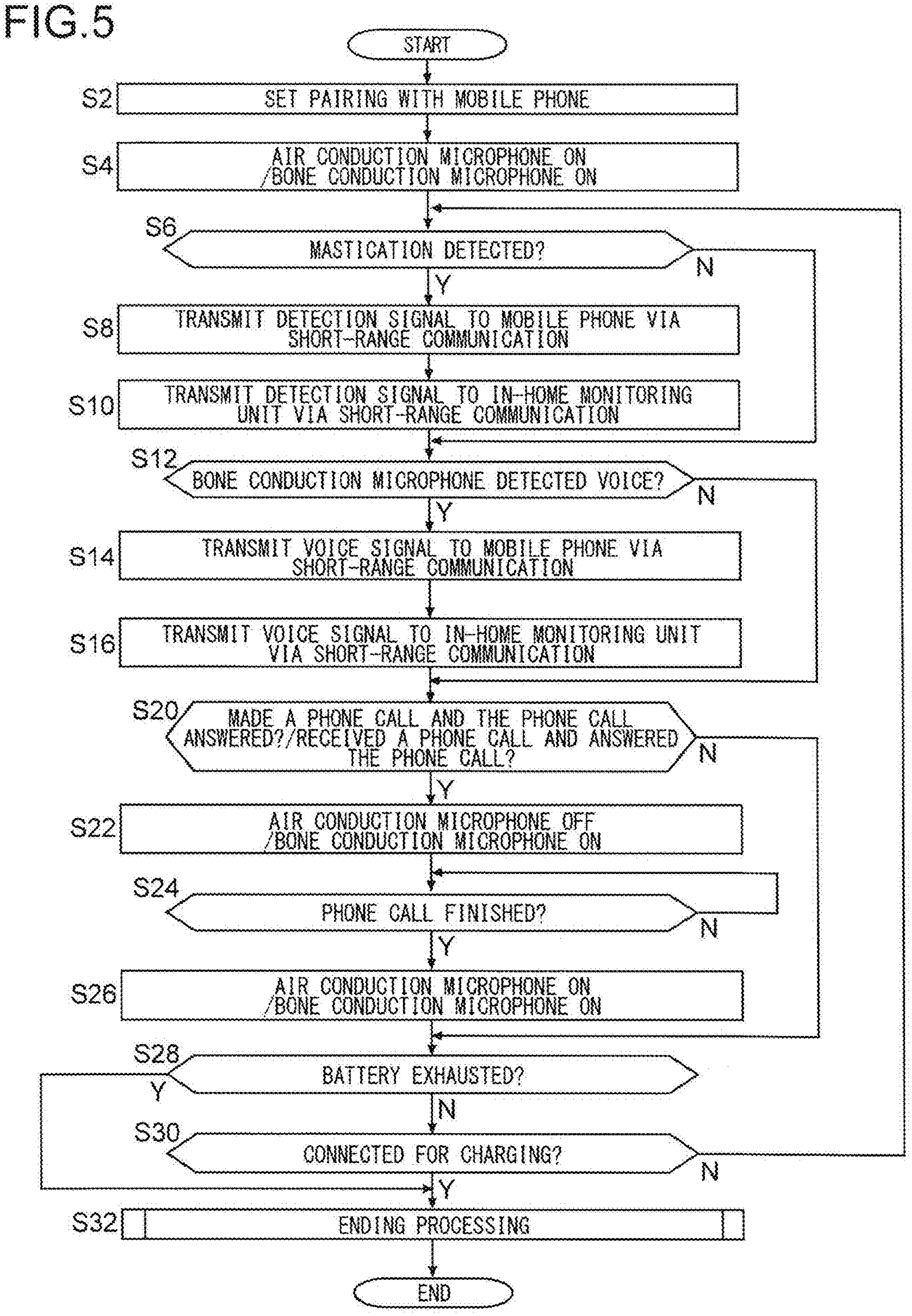
FIG. 5 is a flowchart illustrating a function of an ear-mounted unit in the first embodiment.

FIG. 5 is a flowchart illustrating a function of the control unit 40 of the ear-mounted unit 6 in the watching system of the first embodiment. The flow starts when the ear-mounted unit 6 connected to an unillustrated charger for charging is disconnected from the charger. When the flow starts, in Step S2, it is checked whether or not pairing for short-range communication with the mobile phone 10 has been set, and when no pairing is found to have been set, pairing is automatically set. Next, in Step S4, the air conduction microphone 46 and the bone conduction microphone 44 are turned on. Thereby, the ear-mounted unit 6 starts to function as a hearing aid, and also the bone conduction microphone 44 is brought into a standby state in which it stands by for detection of voice of the watching-target person. Here, although omitted in the flow, the mastication sensor 38 is constantly in an ON state from the start to an end of the flow and in a standby state in which it stands by for detection of mastication.

Next, in Step S6, it is checked whether or not the mastication sensor 38 has detected a masticatory movement. When a mastication movement is found to have been detected, the process proceeds to Step S8, where a detection signal is transmitted to the mobile phone 10 via short-range communication, and then the process proceeds to Step S12. On the other hand, when no mastication movement is found to have been detected in Step S6, the process proceeds directly to Step S12.

In Step S12, it is checked whether or not the bone conduction microphone 44 has detected voice of the watching-target person. When voice of the watching-target person is found to have been detected, the process proceeds to Step S14, and a detected voice signal is transmitted to the mobile phone 10 via the short-range communication, and meanwhile, in Step S16, the detected voice signal is transmitted to the in-home monitoring unit 8 via the short-range communication. Although the steps from Step S12 to Step S16 are illustrated in a simplified manner, in these steps, actually, for a predetermined period of time (10 seconds, for example) after voice starts to be detected by the bone conduction microphone 44, the voice signal continues to be transmitted from the bone conduction microphone 44 simultaneously to the mobile phone 10 and the in-home monitoring unit 8. At this time, even when the voice continues to be detected for a predetermined period of time or longer, the transmission is stopped as soon as the predetermined period of time elapses, whereas even though the voice disappears before the predetermined period of time elapses, the transmission of output of the bone conduction microphone 44 continues to be performed until the predetermined period of time elapses. The above-described transmission of the voice signal continued for a predetermined period of time through the steps from Step S12 to Step S16 is finished, the process proceeds to Step S20. On the other hand, when no voice signal is detected in Step S12, the process proceeds directly to Step S20.

In Step S20, it is checked whether the watching-target person has operated the mobile phone 10 to make a phone call and the other party has answered the phone call, or whether there has been an external incoming call received by the mobile phone 10 and the watching-target person has operated the mobile phone 10 to answer the incoming call. If whichever of the above is found to have occurred, the process proceeds to Step S22, where the air conduction microphone 46 is turned off and the bone conduction microphone 44 is maintained in an on state, and then the process proceeds to Step S24. Thereby, the ear-mounted unit 6 starts to function as a headset for the mobile phone 10, and prevents ambient noise from being picked up by the air conduction microphone 46 to disturb the phone call.

In Step S24, it is checked whether the phone call started in Step S20 has been ended by hanging-up of the phone. Then, when it is detected that the phone call has been ended, the process proceeds to Step S26, where the air conduction microphone 46 is turned on and the bone conduction microphone 44 is maintained in an on state, and the process proceeds to Step S28. Thereby, the ear-mounted unit 6 starts to function as a hearing aid again, and the bone conduction microphone 44 is maintained in the standby state in which it stands by for detection of voice of the watching-target person. On the other hand, when it is found that the phone call has not been ended yet in Step S24, the Step S24 is repeated until end of the phone call is detected. Further, in a case where, in Step S20, neither making a phone call and answering the phone call nor receiving a phone call and answering the phone call is detected, the process proceeds directly to Step S28.

In Step S28, it is checked whether the storage battery of the power supply unit 48 has been exhausted. When the storage battery is found not to have been exhausted, the process proceeds to Step S30, where it is checked whether the ear-mounted unit 6 has been connected to the charger, which is not illustrated, to be charged. This step is provided to deal with a case of removing the ear-mounted unit 6 from the year 4 to be charged even though the storage battery has not been exhausted. When connection for charging is detected in Step S30, the process proceeds to Step S32, where ending processing is performed to end the flow. This is significant in that this helps prevent the ear-mounted unit 6 from being maintained in an operation state by mistake when it is removed from the ear 4 and thus its watching function is disabled. On the other hand, when no connection for charging is detected in Step S30, the process returns to Step S6 to repeat the steps from Step S6 to Step S30 until the storage battery becomes exhausted or connection is achieved for charging, and the ear-mounted unit 6 maintains, as necessary, its hearing-aid function, watching function, and headset function for the mobile phone 10. Here, in a case where it is detected in Step S28 that the storage battery has been exhausted, too, the process proceeds to Step S32, where the ending processing is performed to end the flow.

Figure 6:
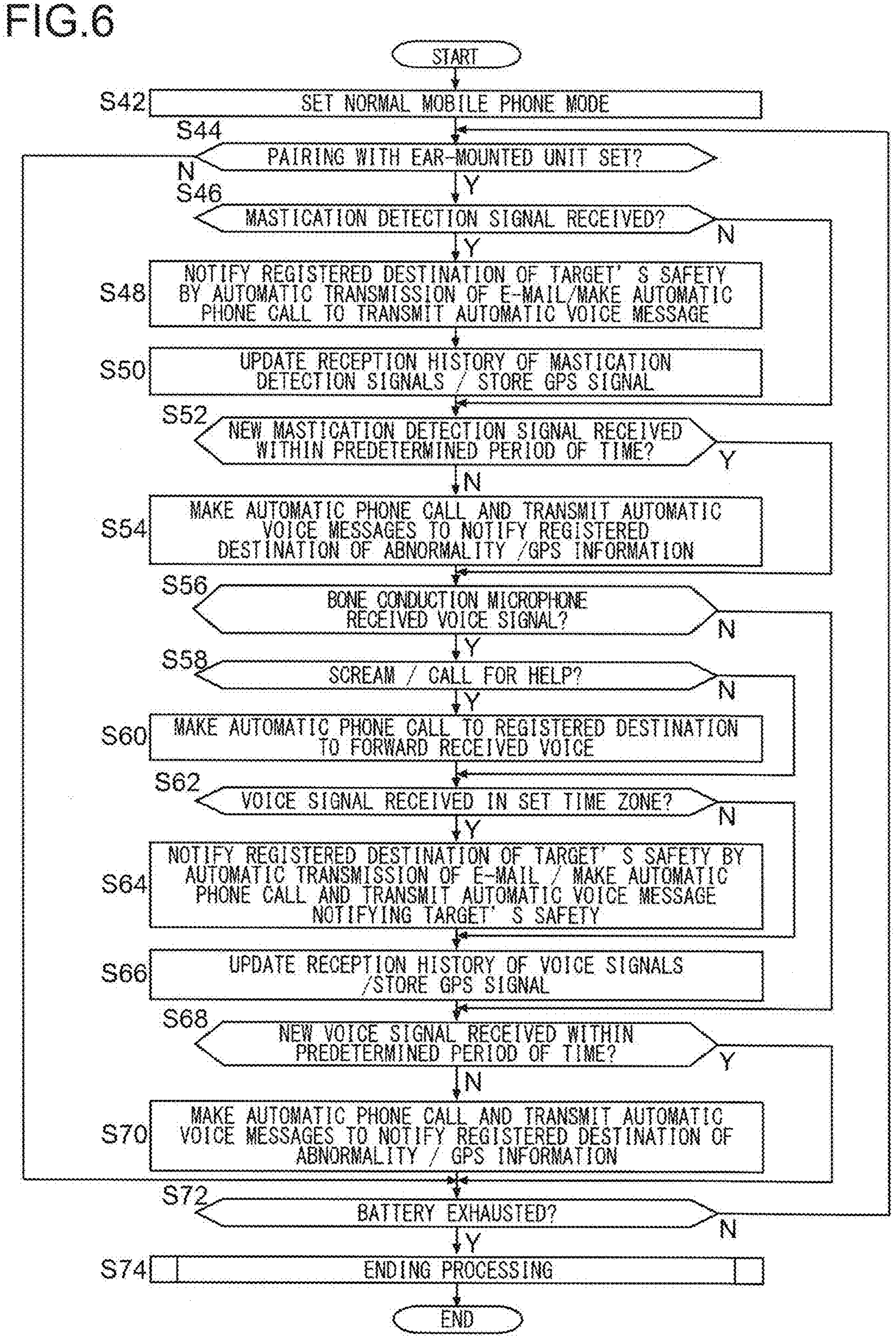
FIG. 6 is a flowchart illustrating a function of a mobile phone in the first embodiment.

FIG. 6 is a flowchart illustrating a function of the control unit 30 of the mobile phone 10 in the first embodiment. Note that FIG. 6 illustrates the flow by extracting operations of functions related to watching, and thus in the mobile phone 10, the control unit 30 has operations that are not described in the flow of FIG. 6, such as operations related to a normal mobile phone function of the mobile phone 10. A hardware configuration itself of the mobile phone 10 is one that is typically adopted in mobile phones, and the functions extracted in FIG. 6 are installed in the ear-mounted unit 6 as accessory software.

The flow of FIG. 6 starts when a power switch of the mobile phone 10 is turned on, and in Step S42, a normal mobile phone mode is set. Next, in Step S44, a check is performed for a state of pairing for the short-range communication with the ear-mounted unit 6. When the pairing is found to have been achieved, watching can be performed by the mobile phone 10 in cooperation with the ear-mounted unit 6, and thus the process proceeds to Step S46.

In Step S46, it is checked whether or not a new mastication detection signal has been received from the ear-mounted unit 6, and when it is found that there has been reception of a new mastication detection signal, the process proceeds to Step S48, where an e-mail notifying that the watching-target person is safe is automatically transmitted to a mobile phone of the member of family of the watching-target person or the like who lives remotely and has been registered in advance. Further, it may be set in advance that in Step S48, instead of sending an e-mail, an automatic phone call is made to the mobile phone of the member of family of the watching-target person or the like who lives remotely and has been registered in advance, and on reception of a response from the mobile phone, an automatic voice message is transmitted to notify him/her that the watching-target person is safe. It is also possible to set such that both an e-mail and a phone call are to be sent and made. As for detecting mastication, which basically takes place three times a day and thus can be regarded as not too often, each time a mastication detection signal is detected, the member of family of the watching-target person or the like who lives remotely is notified that the watching-target person is safe and thereby reassured. Here, in a case where the member of family of the watching-target person or the like who lives remotely feels annoyed by such safety notifications, it is possible to set in advance such that Step S48 will be omitted.

Next, the process proceeds to Step S50, where reception history of mastication detection signals stored in the storage unit 32 is updated, together with time and date information, based on the reception of the new mastication detection signal, and a GPS signal at that time point is also stored in the storage unit 32, and then the process proceeds to Step S52. On the other hand, when reception of a mastication detection signal has not been able to be confirmed in Step S46, the process proceeds directly to Step S52.

In Step S52, based on the reception history stored in the storage unit 32, it is checked whether or not there has been reception of a new mastication detection signal within a predetermined period of time after the reception of the preceding mastication detection signal. When it is found that there has not been reception of a new mastication detection signal within the predetermined period of time, the process proceeds to Step S54, where an automatic phone call is made to the mobile phone of the member of family of the watching-target person or the like who lives remotely and has been registered in advance, and on reception of a response to the phone call, an automatic voice message is transmitted to the effect that there is a possibility of an abnormality, and the process proceeds to Step S56. Further, in Step S54, another automatic voice message is transmitted to notify a current location of the watching-target person based on GPS information obtained then. On the other hand, in Step S52, when it is confirmed from the reception history that there has been reception of a new mastication detection signal, the process proceeds to Step S56.

In Step S56, it is checked whether or not there has been reception of a voice signal picked up by the bone conduction microphone 44 of the ear-mounted unit 6. When it is found that there has been reception of such a voice signal, the process proceeds to Step S58, where it is checked whether or not the received voice is a scream or begging for help (urgency) based on recognized contents of the voice signal (such as words included in the voice signal), intensity of the voice signal, a tone pattern, etc. When there is a high possibility that the voice is a scream or begging for help (when it is judged that it is a highly urgent situation), the process proceeds to Step S60, where an automatic phone call is made to the mobile phone of the member of family of the watching-target person or the like who lives remotely and has been registered in advance, and on reception of a response to the phone call, the received voice itself is transmitted to the mobile phone, and then the process proceeds to Step S62. On the other hand, when, in Step S58, it is judged that the received voice is not a scream or begging for help but merely voice of an ordinary conversation (of low urgency), the process proceeds directly to Step S62.

In Step S62, it is checked whether or not the received voice signal has been received in a time zone (for example, a time zone when the watching-target usually goes shopping, a time zone when the watching-target person usually chants a sutra) previously set based on a regular life pattern. When the result of the check is in the affirmative, the process proceeds to Step S64, where an e-mail is automatically transmitted to the mobile phone of the member of family of the watching-target person or the like who lives remotely and has been registered in advance to notify him/her that the watching-target person is safe, and the process proceeds to Step S66. On the other hand, in Step S62, when the received voice signal is found not to have been received in the previously set time zone, the process proceeds directly to Step S66. Here, a setting same as in Step S48 is also possible, that is, instead of or together with an e-mail, an automatic phone call may be made and automatic voice message may be transmitted. Further, in a case where the member of family of the watching-target person or the like who lives remotely feels annoyed by such safety notifications, it is possible to set in advance such that Steps S62 and S64 will be omitted. The message to be transmitted in Step S64 is not the voice signal actually picked up by the bone conduction microphone 44, but a message notifying merely the fact that there has been reception of a voice signal. Thus, in contrast to in Step S60, contents of conversation of the watching-target person are not heard and thus privacy of the watching-target person is preserved.

In Step S66, reception history of voice signals stored in the storage unit 32 is updated, together with time and date information, based on the reception of the new voice signal, and a GPS signal at that time point is also stored in the storage unit 32, and then the process proceeds to Step S68. On the other hand, in a case where reception of a voice signal picked up by the bone conduction microphone 44 has not been confirmed in Step S56, the process proceeds directly to Step S68.

In Step S68, based on the reception history stored in the storage unit 32, it is checked whether or not there has been reception of a new voice signal within a predetermined period of time after the reception of the preceding voice signal. When there has been no reception of a new voice signal within the predetermined period of time, the process proceeds to Step S70, where an automatic phone call is made to the mobile phone of the member of family of the watching-target person or the like who lives remotely and has been registered in advance, and on reception of a response to the phone call, an automatic voice message is transmitted to the effect that there is a possibility of an abnormality, and then the process proceeds to Step S72. In Step S70, too, another automatic voice message is transmitted to notify a current location of the watching-target person based on GPS information obtained then. On the other hand, when it is confirmed in Step S68 that there has been reception of a new voice signal within the predetermined period of time, the process proceeds directly to Step S72. Here, in a case where setting of pairing with the ear-mounted unit 6 is not confirmed in Step S44, the process proceeds directly to Step S72, the steps for watching are not performed, and the mobile phone 10 functions as an ordinary mobile phone.

In Step S72, it is checked whether or not the storage battery of the power supply unit 34 has been exhausted. When the storage battery is found not to have been exhausted, the process returns to Step S44, and then, the steps from Step S44 to Step S 72 are repeated until exhaustion of the storage battery is detected, such that the mobile phone 10 deals with various situations in watching. On the other hand, in a case where, in Step S72, the storage battery is found to have been exhausted, the process proceeds to Step S74, where ending processing is performed to end the flow.

Figure 7:
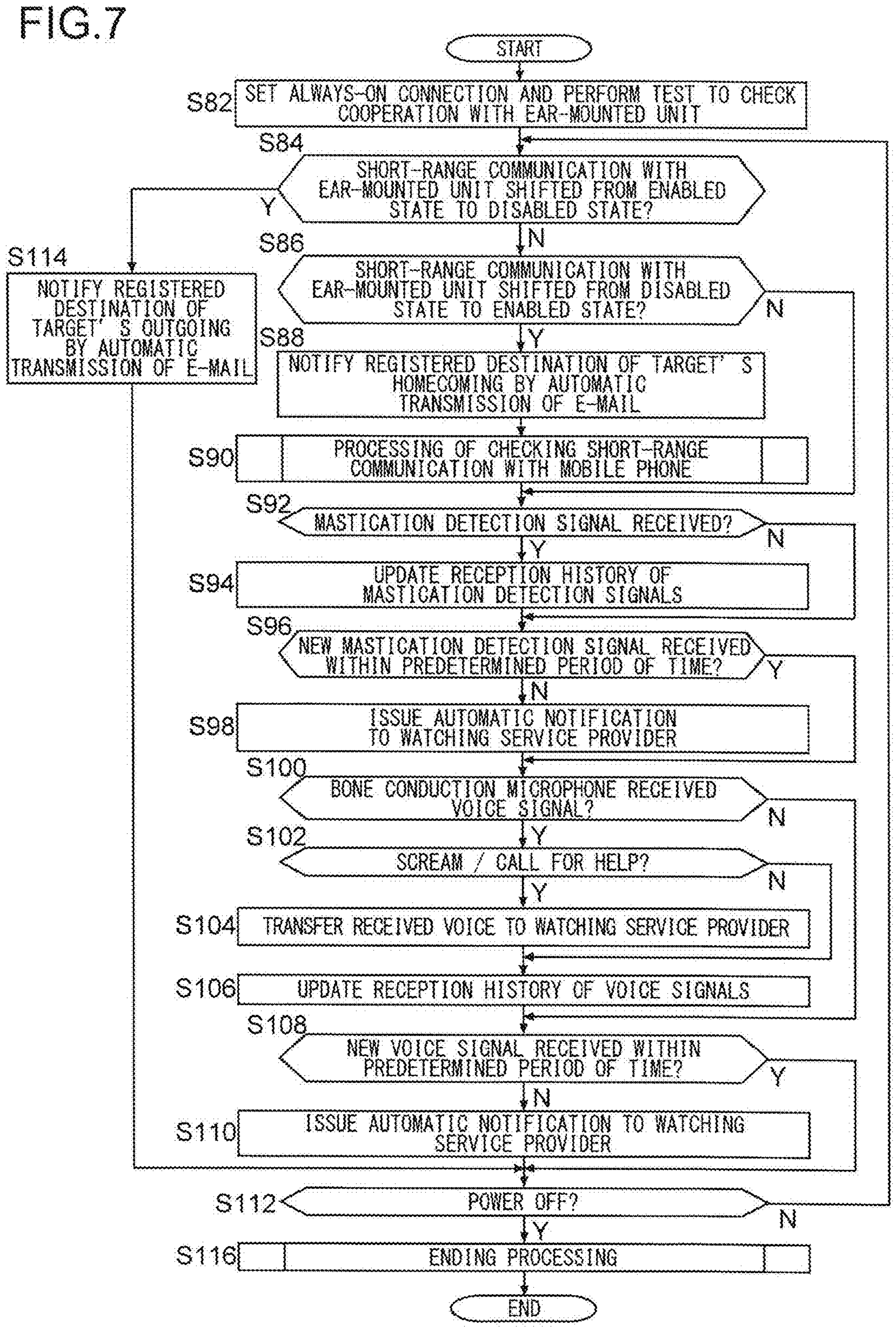
FIG. 7 is a flowchart illustrating a function of an in-home monitoring unit in the first embodiment.

FIG. 7 is a flowchart illustrating a function of the control unit 16 of the in-home monitoring unit 16 in the first embodiment. The flow starts when the in-home monitoring unit 8 is placed and connected to the household power supply or the power supply of the in-home monitoring unit 8 is turned on. Then, in Step S82, always-on connection to the Internet is automatically set for communication with the watching service provider, and an automatic test is performed to check cooperation, such as the short-range communication, with the ear-mounted unit 6, and the process proceeds to Step S84.

In Step S84, it is checked whether or not the state of the short-range communication with the ear-mounted unit 6 has been shifted from an enabled state to a disabled state. This is equivalent to checking whether or not the watching-target person has gone out into a range where the short-range communication is not available. When such shift of the state is found not to have taken place, the process proceeds to Step S86, where it is checked whether or not the state of the short-range communication with the ear-mounted unit 6 has shifted from the disabled state to the enabled state. This is equivalent to checking whether or not the watching-target person has come back into the short-range communication range. When such shift of the state is found to have taken place, the process proceeds to Step S88, where an e-mail is automatically transmitted to the mobile phone of the member of family of the watching-target person or the like who lives remotely and has been registered in advance to notify him/her that the watching-target person has come home.

Further, in Step S90, automatic short-range communication is performed with the mobile phone 10, and processing is performed to confirm that the state of short-range communication has been shifted back into the state of system configuration as illustrated in FIG. 2. This processing is performed because it can be presumed that when the watching-target person is out, the mobile phone 10 is carried by him/her into a range where the short-range communication is not available. In Step S90, if by any chance it cannot be confirmed that the short-range communication is possible with the mobile phone 10, notification to that effect is issued to the watching service provider and to the mobile phone of the member of family of the watching-target person or the like who lives remotely.

In Step S90, further, a cross check of the history of reception from the ear-mounted unit 6 and information exchange are performed between the storage unit 18 of the in-home monitoring unit 8 and the storage unit 32 of the mobile phone 10 to match the information in the storage unit 18 and the information in the storage unit 32 with each other. This is applicable mainly to a case where the watching-target person is out and the in-home monitoring unit 8 cannot receive signals from ear-mounted unit 6, during which information cannot be received from the in-home monitoring unit 8 and thus information is received from the mobile phone 10 instead. This helps prevent inconvenience of, for example, the in-home monitoring unit 8 erroneously recognizing an abnormal state without any signal transmission from the ear-mounted unit 6 for a predetermined period of time or longer, although there has been a transmission of a signal from the ear-mounted unit 6. The function of matching information in the two storage units by the cross check as described above is also useful as a measure to deal with a case where the storage battery of the mobile phone 10 has been exhausted when the mobile phone 10 is in the home 2 and thus information is not received from the ear-mounted unit 6 until the storage battery is recharged.

When the processing in Step S90 is completed, the process proceeds to Step S92, where it is checked whether or not there has been reception of a new mastication detection signal from the ear-mounted unit 6. When it is found that there has been reception of a new mastication detection signal, the process proceeds to Step S94, where reception history of mastication detection signals stored in the storage unit 18 is updated, together with time and date information, based on the reception of the new mastication detection signal, and the process proceeds to Step S96. On the other hand, when reception of a new mastication detection signal has been unable to be confirmed in Step S92, the process proceeds directly to Step S96.

In Step S96, based on the reception history stored in the storage unit 18, it is checked whether or not there has been reception of a new mastication detection signal within a predetermined period of time after the reception of the preceding mastication detection signal. When there is no reception of a new mastication detection signal within the predetermined period of time, the process proceeds to Step S98, where an automatic notification is issued to the watching service provider, with whom a contract has been made in advance, to the effect that there is a possibility of an abnormality, and then the process proceeds to Step S100. On the other hand, when it is confirmed, in Step S96, from the reception history of mastication detection signals, that there has been reception of a new mastication detection signal within the predetermined period of time, it is judged that there is no abnormality occurring, and the process proceeds directly to Step S100.

In Step S100, it is checked whether or not there has been reception of a voice signal picked up by the bone conduction microphone 44 of the ear-mounted unit 6. When it is found that there has been reception of such a voice signal, the process proceeds to Step S102, where it is checked whether or not the received voice is a scream, a cry for help, or the like, based on identification of voice in the contents (words and the like included therein) of the voice signal, intensity pattern, tone, and the like of the voice signal, etc. When there is a high possibility that the voice is a scream or a cry for help, the process proceeds to Step S104, where the received voice itself is transferred to the watching-service provider, and the process proceeds to Step S106. On the other hand, when, in Step S102, it is judged that the received voice is neither a scream nor a cry for help, but voice of an ordinary conversation, the process proceeds directly to Step S106.

In Step S106, reception history of voice signals stored in the storage unit 18 is updated, together with time and data information, based on the reception of the new voice signal, and the process proceeds to Step S108. On the other hand, when reception of a voice signal picked up by the bone conduction microphone 44 has not been confirmed in Step S100, the process proceeds directly to Step S108.

In Step S108, based on the reception history of voice signals stored in the storage unit 18, it is checked whether or not there has been reception of a new voice signal within a predetermined period of time after the reception of the preceding voice signal. When it is found that there has been no reception of a new voice signal within the predetermined period of time, the process proceeds to Step S110, where an automatic notification is issued to the watching service provider to the effect that there is a possibility of an abnormality, and then the process proceeds to Step S112. On the other hand, when it is confirmed in Step S108 that there has been reception of a new voice signal within the predetermined period of time based on the reception history, the process proceeds directly to Step S112. Here, when it is detected in Step S84 that the state of the short-range communication with the ear-mounted unit 6 has been shifted from an enabled state to a disabled state, the process proceeds to Step S114, where an e-mail is automatically transmitted to the mobile phone of the member of family of the watching-target person or the like who lives remotely and has been registered in advance to notify him/her that the watching-target person has gone out, and then the step proceeds to Step S112. In this case, since it is impossible to receive signals from the ear-mounted unit 6 and thus to perform watching, the mobile phone 10 that the watching-target person carries is charged with execution of the watching function, and the in-home monitoring unit 8 does not executes the watching function.

In Step S112, it is checked whether or not power of the in-home monitoring unit 8 has been turned off. Turning off of the power of the in-home monitoring unit 8 includes power-supply disconnection caused by power failure or the like. When it is found that there has been no turning off of the power, the process returns to Step S84, and then the steps of from Step S84 to Step S114 are repeated as long as the power is not turned off, and the in-home monitoring unit 8 deals with various situations in watching. On the other hand, when turning off of the power is detected in Step S112, the process proceeds to Step S116, where ending processing is performed to end the flow.

Second Embodiment

Figure 8:
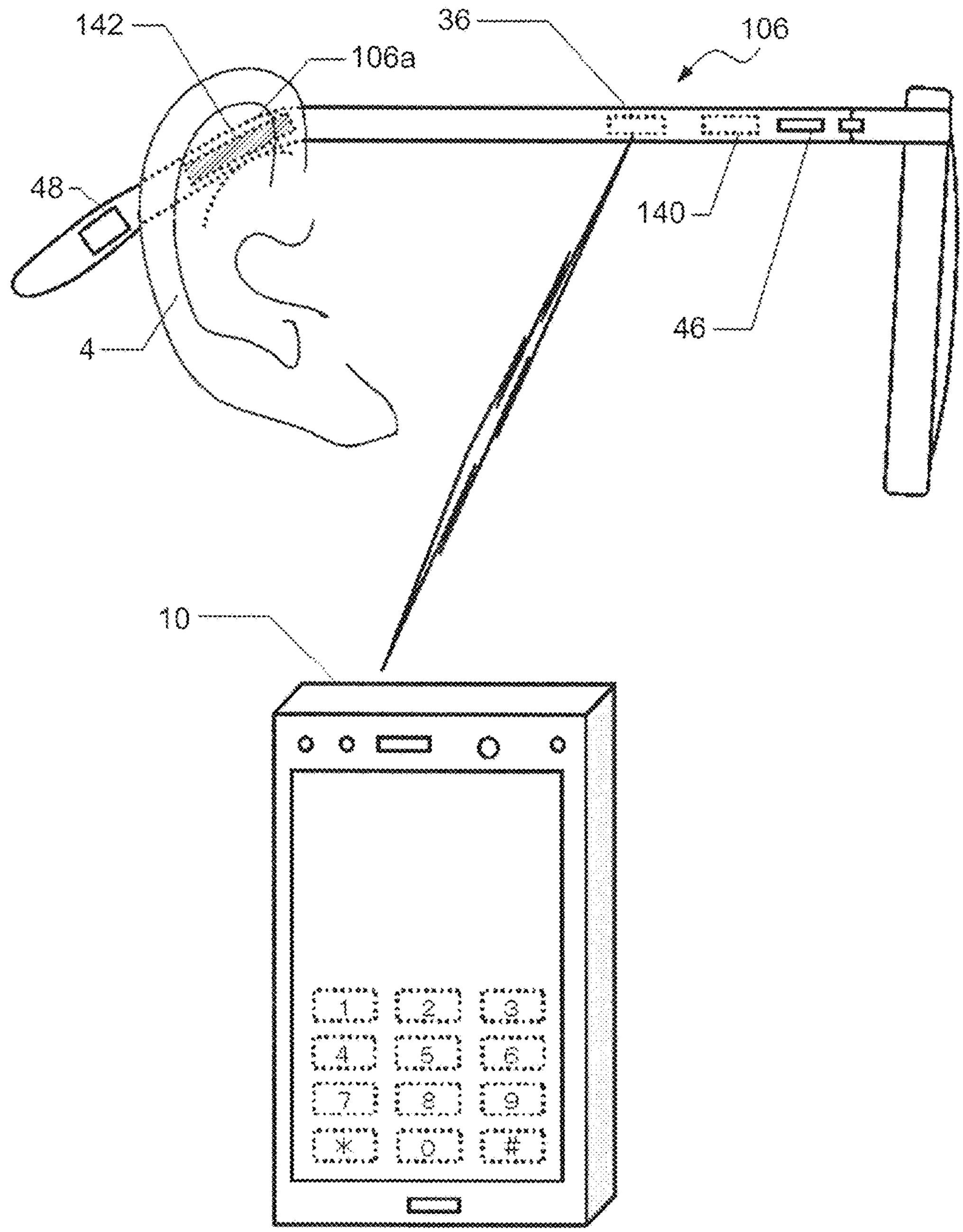
FIG. 8 is a diagram illustrating a system configuration of a second embodiment of the present invention (second embodiment).

FIG. 8 is a diagram illustrating a system configuration of a second embodiment according to an aspect of the present invention. According to the second embodiment, a watching system for watching inside a home includes an eyeglass type ear-mounted unit 106. The other features are the same as the first embodiment illustrated in FIGS. 1 and 2, and thus the common features are denoted by the same reference numerals and overlapping descriptions thereof will not be repeated. In FIG. 8, for the sake of simplicity, a home 2 and an in-home monitoring unit 8 are not illustrated, but configurations thereof are common to those of the first embodiment described in FIGS. 1 and 2.

According to the present invention, a cartilage conduction vibration source, a bone conduction microphone, and a mastication sensor can each be formed with a piezoelectric element, and thus, one piezoelectric element can serve as a cartilage conduction vibration source, a bone conduction microphone, and a mastication sensor. In the second embodiment illustrated in FIG. 8, a piezoelectric bimorph element 142 which serves as a cartilage conduction vibration source, a bone conduction microphone, and a mastication sensor are formed in such part of a temple of eyeglasses as is laid on a cartilage in a base of an ear 4 when the eyeglasses are worn. With this configuration, vibration of the piezoelectric bimorph element 142 is conducted to the cartilage at the base of the ear 4 to cause cartilage conduction. Further, voice by bone conduction is picked up by the piezoelectric bimorph element 142. Further, movement caused by mastication in part close to the base of the ear 4 is also detected by the piezoelectric bimorph element 142. In using the piezoelectric bimorph element 142 for the plurality of functions, extraction and separation of signals fed to and outputted from the piezoelectric bimorph element 142 are achieved by means of signal processing performed by a control unit 140. When the piezoelectric bimorph element 142 is used for the plurality of functions, an air conduction microphone 46, which is originally provided for the purpose of picking up voice of a conversation partner for the function of hearing aid, is used to pick up voice of a watching-target person himself or herself by air conduction, and the picked up voice is used as information for the extraction and separation of signals fed to and outputted from the piezoelectric bimorph element 142. In the second embodiment, too, the entrance of an external auditory canal is left open, and thus it is possible to hear external sound and to achieve comfortable wear of an ear-mounted unit 106 without a feeling of blockage in the external auditory canal. Further, by closing the entrance of the external auditory canal with a finger or completely covering the ear 4 with a palm, it is possible to obtain the occlusion effect in cartilage conduction, to thereby hear a larger sound.

The various features of the embodiments described above can be implemented not only in those specific embodiments but also in any other embodiment so long as they provide their advantages. Moreover, the various features of the embodiments can be implemented with various modifications. Modified features can be implemented in appropriate combinations with each other and with unmodified features.

For example, in the configuration of the first embodiment, one piezoelectric bimorph element may be used for the functions of the cartilage conduction vibration source, the bone conduction microphone, and the mastication sensor as in the second embodiment. Or, conversely, in the second embodiment, the cartilage conduction vibration source, the bone conduction microphone, and the mastication sensor may be formed as optimum separate elements to be optimally disposed at scattered positions.

Further, in the above embodiments, a bone conduction microphone is adopted to pick up voice of a watching-target person, but an air-conducted sound microphone may be used for this purpose (for example, the air conduction microphone 46 serving for this purpose, too).

Conclusive Descriptions

The following is conclusive descriptions of the features of the embodiments disclosed herein.

According to one embodiment disclosed herein, there is provided a watching system including a watching detection device and a watching notification device.

The watching detection device has a cartilage conduction vibration source and a watching detection sensor, and is mountable to an ear with an entrance of an external auditory canal open. The watching notification device receives watching information from the watching detection sensor by performing short-range communication with the watching detection device. This contributes to comfortable wear of the watching detection device.

According to a specific feature, the watching detection device has an air conduction microphone, and functions as a hearing aid by vibrating the cartilage conduction vibration source in accordance with a voice signal picked up by the air conduction microphone. This makes it possible to perform watch by using a hearing aid which is used daily. According to another specific feature, the watching detection device makes the cartilage conduction vibration source vibrate in accordance with a voice signal received from the watching notification device via short-range communication. This makes it possible to perform watch by using a device, such as a mobile phone, through which it is possible to hear a voice signal received from another device.

According to another specific feature, the watching detection sensor is a masticatory movement sensor. According to another specific feature, the watching detection sensor is a voice sensor. For example, the voice sensor is a bone conduction microphone or an air-conducted sound microphone.

According to another specific feature, the watching notification device issues a notification when it has been impossible to receive a detection signal for a predetermined period of time.

According to another embodiment disclosed herein, there is provided a watching system including a watching detection device, and a plurality of watching notification devices which each receive watching information from the watching detection device via short-range communication with the watching detection device. The plurality of watching notification devices exchange with each other the watching information received. This makes it possible to deal with a missing part in the watching information received by one watching notification device by sharing the watching information received by the other watching notification devices, and thus to prevent confusion from occurring among the plurality of watching notification devices.

According to another embodiment disclosed herein, there is provided a watching system including a watching detection device, and a plurality of watching notification devices which each receive watching information from the watching detection device via short-range communication with the watching detection device. The plurality of watching notification devices issue different notifications based on the watching information. This makes it possible to perform watch in a manner suitable to each of the plurality of watching notification devices, which are different from each other in properties. According to a specific feature, the plurality of watching notification devices include a mobile phone and a notification device placed in a home.

According to another embodiment disclosed herein, there is provided a watching system including a watching detection device having a voice sensor, and a watching notification device that receives watching information from the watching detection sensor via short-range communication with the watching detection device. The watching notification device issues a notification of whether a voice signal picked up by the voice sensor is present, without issuing any notification of the contents of the voice signal. This helps protect privacy of a watching-target person. According to a specific feature, the watching notification device makes a judgment on urgency of the voice signal picked up by the voice sensor, and when the urgency is high, the contents of the voice signal is exceptionally notified. This makes it possible to obtain a specific notification in raw voice in a case where a scream or a cry for help has been received.

According to another embodiment disclosed herein, there is provided a watching detection device including a cartilage conduction vibration source and a watching detection sensor, and the watching detection device is mountable to an ear with an entrance of an external auditory canal open. This contributes to comfortable wear of the watching detection device.

According to a specific feature, the watching detection device has an air conduction microphone, and functions as a hearing aid by vibrating the cartilage conduction vibration source in accordance with a voice signal picked up by the air conduction microphone. According to another specific feature, the watching detection device vibrates the cartilage conduction vibration source in accordance with a voice signal received from the watching notification device via short-range communication, to thereby function as a device, such as a mobile phone, through which it is possible to hear a voice signal received from another device.

According to another specific feature, the watching detection sensor is a masticatory movement sensor. According to a more specific feature, the masticatory movement sensor can serve also as the cartilage conduction vibration source. According to another specific feature, the watching detection sensor is a voice sensor. More specifically, the voice sensor is a bone conduction microphone. Still more specifically, the bone conduction microphone can serve also as the cartilage conduction vibration source.

According to another specific feature, the watching detection sensor includes an air-conducted sound microphone for a hearing aid, and the air-conducted sound microphone is turned off when the bone conduction microphone is used. According to another specific feature, the voice sensor is an air-conducted sound microphone.

According to another embodiment disclosed herein, there is provided a watching notification device having an acquisition unit that acquires watching information from a voice sensor and a notification unit that issues a notification of whether a voice signal acquired by the acquisition unit is present, without issuing any notification of contents of the voice signal. This helps protect privacy of a watching-target person. According to a specific feature, the notification unit makes a judgment on urgency of the voice signal picked up by the voice sensor, and the contents of the voice signal is notified exceptionally when the urgency is high.

INDUSTRIAL APPLICABILITY

The present invention is applicable to a watching system, a watching detection device, and a watching notification device.

| List of Reference Signs | |
|---|---|
| 42 | cartilage conduction vibration source |
| 38, 44, 46 | watching detection sensor |
| 6, 106 | watching detection device |
| 12, 26, 36 | short-range communication unit |
| 8, 10 | watching notification device |
| 46 | air conduction microphone |
| 38 | masticatory movement sensor |
| 44, 46 | voice sensor |
| 44 | bone conduction microphone |
| 46 | air-conducted sound microphone |
| 8, 10 | a plurality of watching notification devices |
| 10 | mobile phone |
| 8 | a notification device placed in a home |
| 142 | masticatory movement sensor serving also as cartilage conduction vibration source |
| 142 | bone conduction microphone serving also as cartilage conduction vibration source |

The invention claimed is:

1. A watching detection device comprising:

a cartilage conduction vibration source configured to transmit vibration to cartilage of an ear; and a watching detection sensor configured to detect watching information around the ear;

a short-range communication unit; and an air conduction microphone, wherein the watching detection device is mountable to the ear with an entrance of an external auditory canal of the ear open, the watching detection sensor includes a bone conduction microphone, the short-range communication unit is operable to communicate with a mobile phone, and when the mobile phone makes a call and a response is made to the call, or when the mobile phone receives a call and makes a response to the call, the bone conduction microphone is turned on and the air conduction microphone is turned off.

2. The watching detection device according to claim 1, wherein the watching detection device functions as a hearing aid by vibrating the cartilage conduction vibration source in accordance with a voice signal picked up by the air conduction microphone.

3. The watching detection device according to claim 1, wherein the short-range communication unit communicates with a watching notification device, and the watching detection device makes the cartilage conduction vibration source vibrate in accordance with a voice signal received from the watching notification device via the short-range communication unit.

4. The watching detection device according to claim 1, wherein the watching detection sensor further includes a masticatory movement sensor.

5. The watching detection device according to claim 4, wherein the masticatory movement sensor is a strain gage.

6. The watching detection device according to claim 1, wherein the bone conduction microphone serves also as the cartilage conduction vibration source.

7. A watching system comprising:

the watching detection device according to claim 1; and a watching notification device which receives watching information from the watching detection sensor via short-range communication with the watching detection device.

8. The watching system according to claim 7, wherein the watching notification device issues a notification when it has been impossible to receive a detection signal from the watching detection sensor for a predetermined period of time.

9. The watching system according to claim 7, wherein the watching notification device is the mobile phone, and a voice signal of a call partner received by the mobile phone is transmitted, via short-range communication, to the watching detection device to vibrate the cartilage conduction vibration source.

* * * * *